(12) United States Patent
Badrinarayanan et al.

(10) Patent No.: US 12,079,219 B2
(45) Date of Patent: Sep. 3, 2024

(54) UPDATABLE PRIVATE SET INTERSECTION

(71) Applicant: Visa International Service Association, San Francisco, CA (US)

(72) Inventors: Saikrishna Badrinarayanan, Fremont, CA (US); Peihan Miao, Chicago, IL (US); Tiancheng Xie, Richmond, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/028,696

(22) PCT Filed: May 19, 2021

(86) PCT No.: PCT/US2021/033163
§ 371 (c)(1),
(2) Date: Mar. 27, 2023

(87) PCT Pub. No.: WO2022/076038
PCT Pub. Date: Apr. 14, 2022

(65) Prior Publication Data
US 2023/0359631 A1 Nov. 9, 2023

Related U.S. Application Data

(60) Provisional application No. 63/089,359, filed on Oct. 8, 2020.

(51) Int. Cl.
*G06F 16/2455* (2019.01)
*G06F 16/22* (2019.01)
*G06F 21/60* (2013.01)

(52) U.S. Cl.
CPC .... *G06F 16/24558* (2019.01); *G06F 16/2246* (2019.01); *G06F 21/602* (2013.01)

(58) Field of Classification Search
None
See application file for complete search history.

(56) References Cited

U.S. PATENT DOCUMENTS

2015/0149763 A1   5/2015  Kamara
2018/0329958 A1*  11/2018 Choudhury ......... G06F 16/2456
(Continued)

OTHER PUBLICATIONS

Abadi et al., "O-PSI: Delegated Private Set Intersection on Outsourced Datasets", IFIP Advances in Information and Communication Technology; vol. 455; Available online at: https://www.researchgate.net/publication/283690767>, May 9, 2015, pp. 1-14.
(Continued)

*Primary Examiner* — Eddy Cheung
(74) *Attorney, Agent, or Firm* — Kilpatrick Townsend & Stockton LLP

(57) ABSTRACT

"Updatable" private set intersection (PSI) protocols allow parties that each have an updatable private set to determine the intersection of their sets after an update without the need to compare each element of each set and without compromising privacy. In some protocols, a first party can determine an update to the intersection by determining an intersection of elements that were previously in the first party's set with elements that were added to the second party's set and determining an intersection of elements that were added to the first party's set with elements that are in the second party's (updated) set. In some protocols, both parties can determine the updated intersection.

20 Claims, 13 Drawing Sheets

(56) References Cited

U.S. PATENT DOCUMENTS

2020/0195618 A1 6/2020 Linton et al.
2023/0401331 A1* 12/2023 Xu .................... G06F 21/602

OTHER PUBLICATIONS

De Cristofaro et al., "Practical Private Set Intersection Protocols with Linear Computational and Bandwidth Complexity", Proceedings of Financial Cryptography and Data Security, Available Online at: https://www.researchgate.net/publication/220797059>, May 21, 2014, pp. 1-17.

Faber , "Variants of Privacy Preserving Set Intersection and their Practical Applications", University of California, Irvine; Available Online at: https://escholarship.org/content/qt3vq9n0fp/qt3vq9n0fp.pdf>, 2016, 205 pages.

Application No. PCT/US2021/033163 , International Search Report and Written Opinion, Mailed On Sep. 6, 2021, 12 pages.

Ateniese, "(If) Size Matters: Size-Hiding Private Set Intersection", PKC'11: Proceedings of the 14th international conference on Practice and theory in public key cryptography conference on Public key cryptography, Mar. 2011, 156-173.

Chan et al., "PACT: Privacy-Sensitive Protocols And Mechanisms for Mobile Contact Tracing", IEEE Data Eng. Bull. 43(2), 2020, 15-35.

Chase et al., "Private set intersection in the internet setting from lightweight oblivious PRF", CRYPTO 2020—40th Annual International Cryptology Conference, CRYPTO 2020, Santa Barbara, CA, USA, Aug. 17-21, 2020, Proceedings, Part III, vol. 12172 of Lecture Notes in Computer Science, 2020, 34-63.

Chen et al., "Labeled PSI from Fully Homomorphic Encryption with Malicious Security", Computer and Communications Security, Jan. 15, 2018, pp. 1223-1237.

EP21878153.2 , "Partial Supplementary European Search Report", Feb. 19, 2024, 13 pages.

Kacsmar et al., "Differentially Private Two-Party Set Operations", Institute of Electrical and Electronics Engineers European Symposium on Security and Privacy (EuroS&P), Sep. 7, 2020, pp. 390-404.

Kales et al., "Mobile Private Contact Discovery at Scale", Proceedings of the 28th USENIX Security Symposium. Aug. 14-16, 2019 • Santa Clara, CA, USA, 2019, 1447-1464.

Kolesnikov et al., "Efficient Batched Oblivious PRF with Applications to Private Set Intersection", Proceedings of the 2016 ACM SIGSAC Conference on Computer and Communications Security, Aug. 20, 2016, pp. 1-19.

Pinkas et al., "PSI from paxos: Fast, malicious private set intersection", EUROCRYPT 2020. EUROCRYPT 2020. Lecture Notes in Computer Science(), vol. 12106, May 1, 2020, 28 pages.

Pinkas et al., "SpOT-Light: Lightweight Private Set Intersection from Sparse OT Extension", Advances in Cryptology—CRYPTO 2019. CRYPTO 2019. Lecture Notes in Computer Science(), vol. 11694, Aug. 1, 2019, 34 pages.

Application No. EP21878153.2 , Extended European Search Report, Mailed On May 13, 2024, 9 pages.

* cited by examiner

UPDATABLE PRIVATE SET INTERSECTION

CROSS-REFERENCES TO RELATED APPLICATIONS

This application is a US National Phase of PCT Application No. PCT/US2021/033163, filed May 19, 2021, which claims the benefit of U.S. Application No. 63/089,359, filed Oct. 8, 2020, the disclosures of which are incorporated herein by reference.

BACKGROUND

"Private set intersection," or "PSI," refers to a computer-implemented protocol that allows one or both of two parties to determine the intersection of a first set associated with the first party and a second set associated with the second party. The protocol is designed such that one party (or both parties, depending on the protocol) can learn the intersection without learning any elements of the other party's set that are not in the intersection. For instance, in the context of contact-tracing to control spread of a virus, it may be desirable to identify contacts that two individuals have in common, without either individual learning anything else about the other's contacts. One known approach to PSI involves the parties exchanging versions of the elements that have been effectively encrypted (e.g., using decisional Diffie-Hellmann, or DDH, techniques) such that the receiving party cannot decrypt the elements but can compare them to correspondingly-encrypted versions of elements in the receiving party's own set to detect matches. In this manner, the receiving party can determine the intersection without learning any members of the other party's set that are not in the intersection.

Existing algorithms for PSI are not well adapted for situations where the sets are updated from time to time and determining an updated intersection of the sets is desired. For instance, if a new element is added to one party's set, each party must process (encrypt, send, and compare) its entire set again to determine the intersection. Thus, PSI protocols can become resource-intensive, particularly where the sets are large. For example, computation time may scale quasi-linearly with the total number of elements in the sets, and communication may scale linearly with the total number of elements in the sets.

SUMMARY

Certain embodiments disclosed herein relate to protocols for "updatable PSI" that can reduce the computational effort required to perform PSI to update the intersection of two sets in a context where the sets can be updated from time to time. Some updatable PSI techniques disclosed herein preserve the property that one party (or both parties if desired) can learn the intersection without learning any elements of the other party's set that are not included in the intersection.

Some embodiments relate to methods of computing a private set intersection (PSI) that can be performed in a first computer system. For example, the first computer system can define a first set (A) that is private to the first computer system, wherein the first set A includes a first residual subset $A_{old}$ of elements that are not in an intersection (A∩B) with a second set (B) that is private to a second computer system, wherein the second set B includes a second residual subset ($B_{old}$) of elements that are not in the intersection A∩B. The first computer system can update the first set A by adding a first new subset ($A_d$) of one or more new elements. Based on a first communication process with the second computer system, the first computer system can determine a first partial intersection ($I_{A,old}=A_{old}∩B_d$) of the first residual subset $A_{old}$ with a second new subset $B_d$ of one or more new elements that have been added to the second set B, wherein the first computer system learns only the elements of the second new subset $B_d$ that are in the first partial intersection $I_{A,old}$. The first computer system can receive from the second computer system a first encrypted set ($B'_d$) that includes encrypted elements representing the second new subset $B_d$ and at least some elements of the second residual subset $B_{old}$. In some embodiments, the first computer system can provide second encrypted set that includes elements representing the first new subset $A_d$ to the second computer system, and the first encrypted set B'd can include a union of the second new subset $B_d$ with an intersection ($A_d∩B_{old}$) of the first new subset $A_d$ and the second residual subset $B_{old}$. In some embodiments, the first encrypted set the first encrypted set $B'_d$ is received as a binary tree structure that includes encrypted elements corresponding to the elements of the second new subset $B_d$ and the second residual subset $B_{old}$. Based on a second communication process with the second computer system, the first computer system can determine a second partial intersection ($I_{A,new}=A_d∩B'_d$) of the first new subset $A_d$ and the first encrypted set $B'_d$, wherein the first computer system learns only the elements of the first encrypted set $B'_d$ that are in the second partial intersection $I_{A,new}$. The first computer system can update the intersection A∩B based on the first partial intersection $I_{A,old}$ and the second partial intersection $I_{A,new}$ and update the first residual subset $A_{old}$ based on the updated intersection. In some embodiments, the first computer system can provide the updated intersection A∩B to the second computer system. The acts of updating the first set A, receiving the first set of encrypted data, determining the first partial intersection, receiving the first encrypted set, determining the second partial intersection, updating the intersection A∩B, and updating the first residual subset are performed iteratively for each of a plurality of successive update periods.

Some embodiments relate to methods of computing a private set intersection (PSI) that can be performed in a first computer system. The first computer system can define a first set (A) that is private to the first computer system, wherein the first set A includes a first residual subset $A_{old}$ of elements that are not in an intersection (A∩B) with a second set (B) that is private to a second computer system, wherein the second set B includes a second residual subset ($B_{old}$) of elements that are not in the intersection A∩B. The first computer system can update the first set A by adding a first new subset ($A_d$) of one or more new elements (x). The first computer system can receive, from the second computer system, a binary tree structure representing the second set B, wherein each element of the second set B is assigned to a node in the binary tree structure based on a hash function and wherein the binary tree structure is encrypted such that each element of the second set B is represented by a ciphertext in the assigned node. The first computer system can process each new element x in the first new subset $A_d$, wherein processing each new element x includes: identifying a corresponding node of the binary tree structure for the new element x; in the event that the corresponding node is non-empty, using the ciphertexts in the corresponding node and a two-party computation protocol with the second computer system to determine whether the new element x matches any of the elements of set B that are assigned to the corresponding node; and adding the new element x to a first partial intersection ($I_{A,new}$) in the event that the new element x matches an element of set B that is assigned to the corresponding node; and using the first partial intersection $I_{A,new}$ to update the intersection A∩B. In some embodiments, the first computer system can also receive, from the second computer system, a first set of encrypted data representing a second new subset ($B_d$) of one or more elements that have been added to the second set B; determine, using the first set of encrypted data and a correspondingly encrypted representation of the first residual subset $A_{old}$, a second partial intersection ($I_{A,old}=A_{old}\cap B_d$) of the first residual subset $A_{old}$ with the second new subset $B_d$; and use the second partial intersection $I_{A,old}$ along with the first partial intersection $I_{A,new}$ to update the intersection A∩B. In some embodiments, the acts of updating the first set A, receiving the binary tree structure, processing each new element x in the added set $A_d$, receiving the first set of encrypted data, determining the second partial intersection $I_{A,old}$, and using the second partial intersection $I_{A,old}$ along with the first partial intersection $I_{A,new}$ to update the intersection A∩B are performed iteratively for each of a plurality of successive update periods.

Some embodiments relate to methods of computing a private set intersection (PSI) that can be performed in a first computer system. The first computer system can define a first set (B) that is private to the first computer system and update the first set B by adding a first new subset ($B_d$) of one or more new elements. The first computer system can update a binary tree structure representing the first set B, wherein each element of the second set B is assigned to a node in the binary tree structure based on a hash function (which can be, e.g., a level-specific hash function). The first computer system can encrypt the binary tree structure (e.g., using an additive homomorphic encryption scheme) such that each element of the second set B is represented by a ciphertext in the assigned node. The first computer system can send the encrypted binary tree structure to a second computer system, wherein the second computer system has a second set A that is private to the second computer system. The first computer system can participate in a secure two-party computation protocol (e.g., using additive homomorphic encryption) with the second computer system that enables the second computer system to determine which elements of the first set B are in an intersection (A∩B) with a second new subset ($A_d$) of the second set A. In some embodiments, the acts of updating the first set B, updating the binary tree structure, encrypting the binary tree structure, sending the encrypted binary tree structure, and participating in the secure two-party computation protocol are performed iteratively for each of a plurality of successive update periods.

Some embodiments relate to methods of computing a private set intersection (PSI) that can be performed in a first computer system. The first computer system can define a first set (A) that is private to the first computer system, wherein the first set A includes a plurality of subsets ($A_{d-t+1}, \ldots, A_{d-1}, A_d$), each subset associated with a different one of a plurality of update cycles, wherein t is a constant persistence time and d is an update cycle counter. The first computer system can perform a first plurality of instances of a private-set intersection process with a second computer system, wherein the second computer system has a second set (B) that is private to the second computer system, wherein the second set B includes a plurality of subsets ($B_{d-t+1}, \ldots, B_{d-1}, B_d$), each subset associated with a different one of the plurality of update cycles, and wherein for each of the first plurality of instance of the private set intersection process, the first computer system uses a different subset ($A_j$) selected from the subsets $A_{d-t+1}, \ldots, A_{d-1}$ as an input and the second computer system uses the subset $B_d$ as an input. The first computers system can determine a first partial intersection $I_{0,\alpha}=\cup_{j=(d-t+1)}^{d-1}(A_j \cap B_d)$ based on outputs of the first plurality of instances of the private-set intersection process. The first computer system can perform a second plurality of instances of a private-set intersection process with the second computer system, wherein for each of the second plurality of instances of the private set intersection process, the first computer system uses the subset $A_d$ as an input and the second computer system uses a different one of the subsets $B_{d-t+1}, \ldots, B_{d-1}$ as an input, and wherein the second computer system determines a second partial intersection $I_{1,\alpha}=\cup_{j=(d-t+1)}^{d-1}(B_j \cap A_d)$ based on outputs of the second plurality of instances of the private-set intersection process. The first computer system can perform an additional instance of the private-set intersection process with the second computer system, wherein for the additional instance of the private-set intersection process, the first computer system uses the subset $A_d$ as an input and the second computer system uses a third set (B') that includes the subset $B_d$ and the second partial intersection $I_{1,\alpha}$. Based on an output of the additional instance of the private-set intersection process, the first computer system can determine a third partial intersection $I_{0,\beta}=A_d \cap (\cup_{j=d-t+1}B_j)$. The first computer system can determine an intersection A∩B based on the first partial intersection $I_{0,\alpha}$ and the third partial intersection $I_{0,\beta}$. In some embodiments, the acts of performing the first plurality of instances of a private-set intersection process, determining the first partial intersection, performing the second plurality of instances of the private-set intersection process, performing the additional instance of the private-set intersection process; determining the third partial intersection; and determining the intersection A∩B are performed iteratively for each of a plurality of successive update periods, wherein the update cycle counter d increments for each update period.

The following detailed description, together with the accompanying drawings, will provide a better understanding of embodiments of the invention.

TERMS

Figure 1:
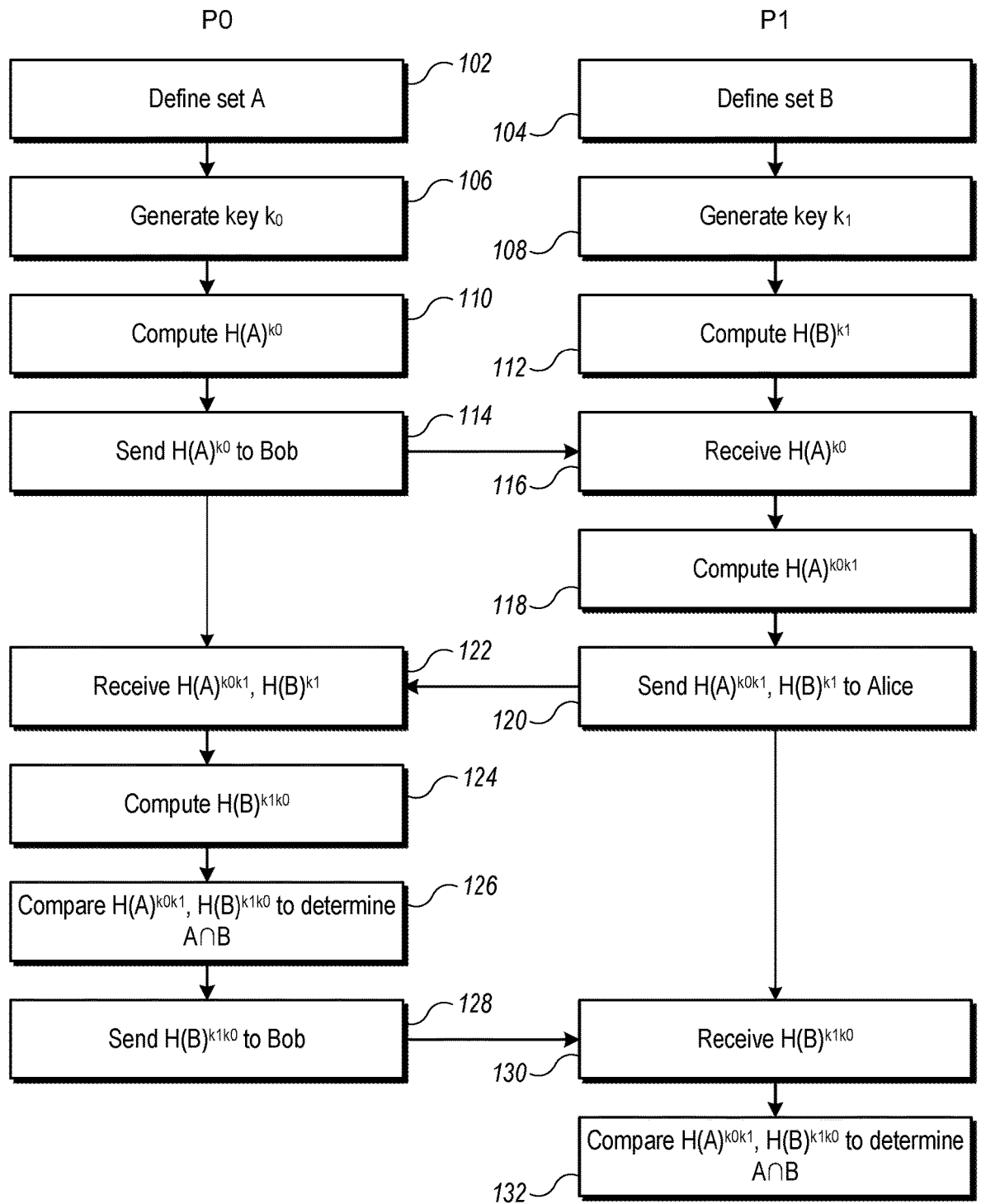
FIG. 1 shows a flow diagram of a process for determining a private set intersection (PSI) using DDH-based techniques.

The following terms may be used herein.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "client" or "client computer" may include a computer system or other electronic device that communicates with a server computer to make requests of the server computer and to receive responses. For example, the client can be a laptop or desktop computer, a mobile phone, a tablet computer, a smart speaker, a smart-home management device, or any other user-operable electronic device.

A "memory" may include suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may include any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Ryzen, and/or EPYC processors; IBM and/or Motorola's PowerPC; IBM's and Sony's Cell processor; Intel's Celeron, Pentium, Xeon, and/or Core processors; and/or other commercially available processor(s).

A "communication device" may include any electronic device that may provide communication capabilities including communication over a mobile phone (wireless) network, wireless data network (e.g., 3G, 4G, or similar networks), Wi-Fi, Wi-Max, or any other communication medium that may provide access to a network such as the Internet or a private network. Examples of communication devices include mobile phones (e.g., cellular phones), PDAs, tablet computers, net books, laptop computers, personal music players, hand-held specialized readers, wearable devices (e.g., watches), vehicles (e.g., cars), etc. A communication device may comprise any suitable hardware and software for performing such functions, and may also include multiple devices or components (e.g., when a device has remote access to a network by tethering to another device—i.e., using the other device as a relay—both devices taken together may be considered a single communication device).

A "set" can refer to a group of data values that represent items of information stored by a computer system. The data values can be represented as binary numbers having some number of digits, which can be a fixed number. A set can include items of a particular type of information, such as contacts between two people or two devices, location information, transaction information, and so on. In examples below, sets are "updatable," meaning that new items of information can be added to a set from time to time, and in some embodiments old items of information may be removed from the set after some fixed period of time.

An "encryption key" may include any data value or other information suitable to cryptographically encrypt data. A "decryption key" may include any data value or other information suitable to decrypt encrypted data. In some cases, the same key used to encrypt data may also be usable to decrypt the data. Such a key is referred to as a "symmetric encryption key."

The term "public/private key pair" (also referred to as a "key pair") may include a pair of linked cryptographic keys generated by or provided to an entity (e.g., a computer, communication device, or other electronic device) that "owns" the key pair. A public/private key pair may be used with an asymmetric encryption algorithm so that data encrypted using the "public" key of the pair can be decrypted using the "private," or "secret," key of the pair (and vice versa). The public key of a key pair may be provided to other entities and used for public functions such as encrypting a message to be sent to the owner of the key pair or for verifying a digital signature that was purportedly generated by the owner of the key pair. The public key may be authorized or verifiable by a body known as a Certification Authority (CA), which stores the public key in a database and distributes it to any entity that requests it. The private, or secret, key is typically stored in a secure storage medium and known only to the owner of the key pair. It should be understood that some cryptographic systems may provide key recovery mechanisms for recovering lost secret keys and avoiding data loss.

A "shared secret" may include any data value or other information known only to authorized parties in a secure communication. A shared secret can be generated in any suitable manner, from any suitable data. For example, a Diffie-Hellman-based algorithm such as Elliptic-Curve Diffie-Hellman (ECDH) may be used.

"Additively homomorphic encryption" (or "AHE") refers to a public-key encryption scheme (including a key generation function $(pk,sk,)\leftarrow\text{KeyGen}(1^\lambda)$, encryption function $ct\leftarrow\text{Enc}_{pk}(m;r)$, and decryption function $m/\bot\leftarrow\text{Dec}_{sk}(ct))$ over a message space $\mathcal{M}$ that exhibits correctness, CPA security (i.e., security against chosen-plaintext attacks, and linear homomorphism such that $\text{Enc}_{pk}(m_1)\oplus\text{Enc}_{pk}(m_2)=\text{Enc}_{pk}(m_1+m_2)$ for $\forall m_1, m_2 \in \mathcal{M}$ and $c\odot\text{Enc}_{pk}(m)=\text{Enc}_{pk}(c\cdot m)$ for $\forall c, m\in \mathcal{M}$. In the description below, each homomorphic evaluation can be followed by a refresh operation in which the resulting ciphertext is added with an independently generated encryption of zero. This ensures that the randomness of the final ciphertext is independent of the randomness used in the original set of ciphertexts.

The "decisional Diffie-Hellman assumption," or "DDH assumption," states that, if $\mathcal{G}$ is a cyclic multiplicative group of prime order q with generator g, and if a, b, c are sampled uniformly at random from $\mathbb{Z}_q$, then $(g^a, g^b, g^{ab}) \stackrel{c}{\approx} (g^a, g^b, g^c)$ where the notation $\stackrel{c}{\approx}$ indicates that two distributions are computationally indistinguishable.

"Cuckoo hashing" is a hashing process that assigns a set of some number (n) of items into some number (b) of bins. The process can be as follows. First, random functions $H_1$, $H_2$, $H_3$: $\{0,1\}^* \rightarrow [b]$ are chosen, and empty bins B [1, . . . , b] are initialized. To hash an item x, a determination is made as to whether any of the bins $B[H_1(x)]$, $B[H_2(x)]$, $B[H_3(x)]$ are empty. If so, then item x is placed into one of the empty bins and the process terminates. If not, then a random number $i \in \{1,2,3\}$ is chosen, the item currently in bin $B[H_i(x)]$ is evicted and replaced with item x; then a recursive process is used to insert the evicted item into another bin. If the process does not terminate after a fixed number of iterations, the final evicted item is placed in a special bin called the "stash."

DETAILED DESCRIPTION

The following description of exemplary embodiments of the invention is presented for the purpose of illustration and description. It is not intended to be exhaustive or to limit the invention to the precise form described, and persons skilled in the art will appreciate that many modifications and variations are possible. The embodiments have been chosen and described in order to best explain the principles of the invention and its practical applications to thereby enable others skilled in the art to best utilize the invention in various embodiments and with various modifications as are suited to the particular use contemplated.

Certain embodiments disclosed herein relate to protocols for updatable private set intersection ("updatable PSI") that reduce the computational effort required to repeatedly determine the intersection of two private sets held by different parties in a context where the sets are updated from time to time.

By way of example, scenarios are contemplated in which two parties (which can be computer systems), referred to as P0 and P1, each collect information items that can be represented as elements in a set. The information items might be, for example, identifiers of people or entities (or devices) that P0 or P1 has had contact with. It is also contemplated that information items held by P0 and/or P1 can change over time; for instance, each party may encounter new contacts each day. It is assumed to be desirable to enable P0 and/or P1 to determine which information items the sets have in common (e.g., whether they have come into contact with the same person), without exposing their full sets of information items to each other, and to update the set of common information items (the intersection of P0's set with P1's set) from time to time.

PSI can be performed on two sets. FIG. 1 shows a flow diagram of a process 100 using decisional Diffie-Hellman ("DDH")-based PSI techniques that can be implemented in a pair of suitably configured computer systems (or in different processes in the same computer system that do not share data access). It is assumed that a first party, P0 is in possession of a first set A having some number (N) of elements, while a second party, P1, is in possession of a second set B having some number of elements (which need not be equal to the number of elements in set A.

At blocks 102 and 104, each party defines its set: P0 defines set A, at block 102, and P1 defines set B at block 104. For example, each party may define its set by collecting data in the course of regular activity, such as collecting information provided by various devices or individuals encountered by that party. At blocks 106 and 108, each party generates a secret exponentiation key: P0 generates key k0, and P1 generates key k1. At blocks 110 and 112, each party hashes its set using a hash function $H:\{0,1\}^* \to \mathcal{G}$, where $\mathcal{G}$ is a group of prime order q with generator g, and raises the result to the power of tis exponentiation key. As used herein, "hashing a set" refers to applying the same hash function to each element of the set; that is, $H(A):=\{H(a)|a \in A\}$ and $H(B):=\{H(b)|b \in B\}$. Raising to a power is also performed for each element of the set, so that $H(A)^{k0}:=\{H(a)^{k0}|a \in A\}$ and $H(B)^{k1}:=\{H(b)^{k1}|b \in B\}$. At block 114, P0 sends the hash set $H(A)^{k0}$ to P1, and at block 116, P1 receives $H(A)^{k0}$. P1 is not able to reverse the exponentiation and hashing operations to extract the elements of set A. At block 118, P1 computes $H(A)^{k0k1}$ by raising each element of $H(A)^{k0}$ to the k1 power. At block 120, P1 sends $H(A)^{k0k1}$ and $H(B)^{k1}$ to P0.

At block 122, P0 receives $H(A)^{k0k1}$ and $H(B)^{k1}$. P0 is not able to reverse the exponentiation and hashing operations to extract the elements of set B. Instead, at block 124, P0 computes $H(B)^{k1k0}$ by raising each element of $H(B)^{k1}$ to the k0 power. At block 126, P0 can compare the elements $H(A)^{k0k1}$ to the elements $H(B)^{k1k0}$ and identify matches. As long as P0 knows which element $H(A)^{k0k1}$ maps to which element a of set A, P0 can determine A∩B based on which elements $H(A)^{k0k1}$ match an element of $H(B)^{k1k0}$. In this process, P0 only learns the elements of set B that are elements of A∩B.

To enable P1 to also determine A∩B, P0 can send $H(B)^{k1k0}$ to P1 at block 128. P1 can receive $H(B)^{k1k0}$ at block 130. At block 132, P1 can perform the same comparison performed by P0 at block 126 to determine A∩B. In this process, P1 only learns the elements of set A that are elements of A∩B.

In a case where the sets A and B are updated from time to time, process 100 can be re-performed to allow parties P0 and P1 to update the intersection A∩B. For instance, suppose that initially (on "Day 0"), set A includes a set A0 consisting of $N_0$ elements, and set B includes a set B0 consisting of $N_0$ elements. P0 and P1 perform process 100 to determine A0∩B0.

On Day 1, P0 adds a set A1 consisting of $N_d$ elements to its set (so that A=A0∪A1) and P1 adds a set B1 consisting of $N_d$ elements to its set (so that B=B0∪B1). P0 and P1 can re-perform process 100 of FIG. 1 to determine A∩B= (A0∪A1)∩(B0∪B1). By comparing the Day-0 results and the $\mathcal{G}$ Day-1 results, P0 can learn A1∩(B0∪B1) and can also learn A0∩B1. However, P0 would not learn A1∩B1 or A1∩B0. Likewise, P1 can learn B1∩(A0∪A1) and B0∩A1 but not B1∩A1 or B1∩A0.

Repeating the process of FIG. 1 each time the sets are updated entails operations on all elements of both sets, including elements already known to be in the intersection. Re-performing the PSI process each day generates an ever-increasing computational load as elements are added to sets A and B. In particular, the computing time scales as O(N), where N is the total number of elements in each set If $N_0$ is the number of elements in the sets when PSI process 100 is first performed and $N_d$ is the number of elements added between iterations, computing time scales as $O(N_0+N_d)$. Communication load also scales as $O(N_0+N_d)$ since each party communicates representations of every element of its sets on every iteration.

According to some embodiments of the invention, the computational and/or communication load can be reduced by performing an "updatable PSI" protocol that eliminates the need to perform operations on all elements of both sets each time an update is desired. In some embodiments, the updatable PSI protocol does not leak any information (to either party) that would not be revealed by re-performing the PSI process of FIG. 1 across the entire pair of sets. Thus, updatable PSI as described herein can provide the same privacy protection as re-performing PSI across all elements of both sets, with reduced computational and/or communication load.

Embodiments of updatable PSI protocols described herein involve iterative processes that can be repeated from time to time. An "update period" refers to the time between iterations of the iterative process. For simplicity of description, the update period is sometimes referred to as being a "day"; however, those skilled in the art will understand that an update period can be as long or short as desired. At the end of each update period, the parties (referred to as P0 and P1) can execute one iteration of the updatable PSI protocol. To learn the updated intersection $I_{[d]}$ on each day d, parties P0 and P1 only need to learn the update set $I_{update}=I_{[d]} \setminus I_{[d-1]}$. In notation used herein, $A_d(B_d)$ represents the elements added to P0's (P1's) set on day d, and $A_{[d]}(B_{[d]})$ represents P0's (P1's) complete set as of day d; that is $A_{[d]}=\cup_{i=0}^{d}A_i= A(B_{[d]}=\cup_{i=0}^{d}B_i=B)$.

Some embodiments described herein exploit the observation that $I_{update}$ can be split into two disjoint sets: $I_{A,old} = A_{A,old} \cap B_d$ (where $A_{old} := A_{[d-1]} \backslash I_{[d-1]}$) and $I_{Anew} = A_d \cap B_{[d]}$. Therefore, it suffices to let P0 learn both $I_{A,old}$ and $I_{A,new}$. Symmetrically, if $B_{old} := B_{[d-1]} \backslash I_{[d-1]}$, then $I_{update}$ can also be split into $I_{B,old} = B_{old} \cap A_d$ and $I_{B,new} = B_d \cap A_{[d]}$ to allow P1 to compute the intersection. Protocols to allow P0 to learn $I_{A,old}$ and $I_{A,new}$ (and, if desired, to also allow P1 to learn $I_{B,old}$ and $I_{B,new}$) can be designed such that no information is leaked that would not be learned by performing process 100 to determine $A_{[d-1]} \cap B_{[d-1]}$ then re-performing process 100 to determine $(A_{[d-1]} \cup A_d) \cap (B_{[d-1]} \cup B_d)$.

An example of a "two-way" updatable PSI protocol that allows both parties to learn the intersection each day (or other update period) will now be described. In this example, the updates to the sets are "additive"; that is, elements are added to, but not removed from, sets A and B. (An example that also considers deletion is described below.) It is also assumed that parties P0 and P1 are semi-honest, and each party does not retain or apply information received from the other, except as specified by the protocol. In this two-way protocol, it is observed that $I_{A,new} = A_d \cap B_{[d]} = A_d \cap (B_d \cup B_{old})$ because, by definition, any elements of $B_{[d]}$ that are not in $B_{old}$ or $B_d$ are already in A∩B. Further, since P1 determines $I_{B,old} = B_{old} \cap A_d$, P1 can provide a set $B'_d = B_d \cup (B_{old} \cap A_d)$ that is, for purposes of determining $I_{A,new}$, equivalent to $B_d \cup B_{old}$. This can reduce the number of elements that are encrypted and exchanged between the parties.

Figure 2A:
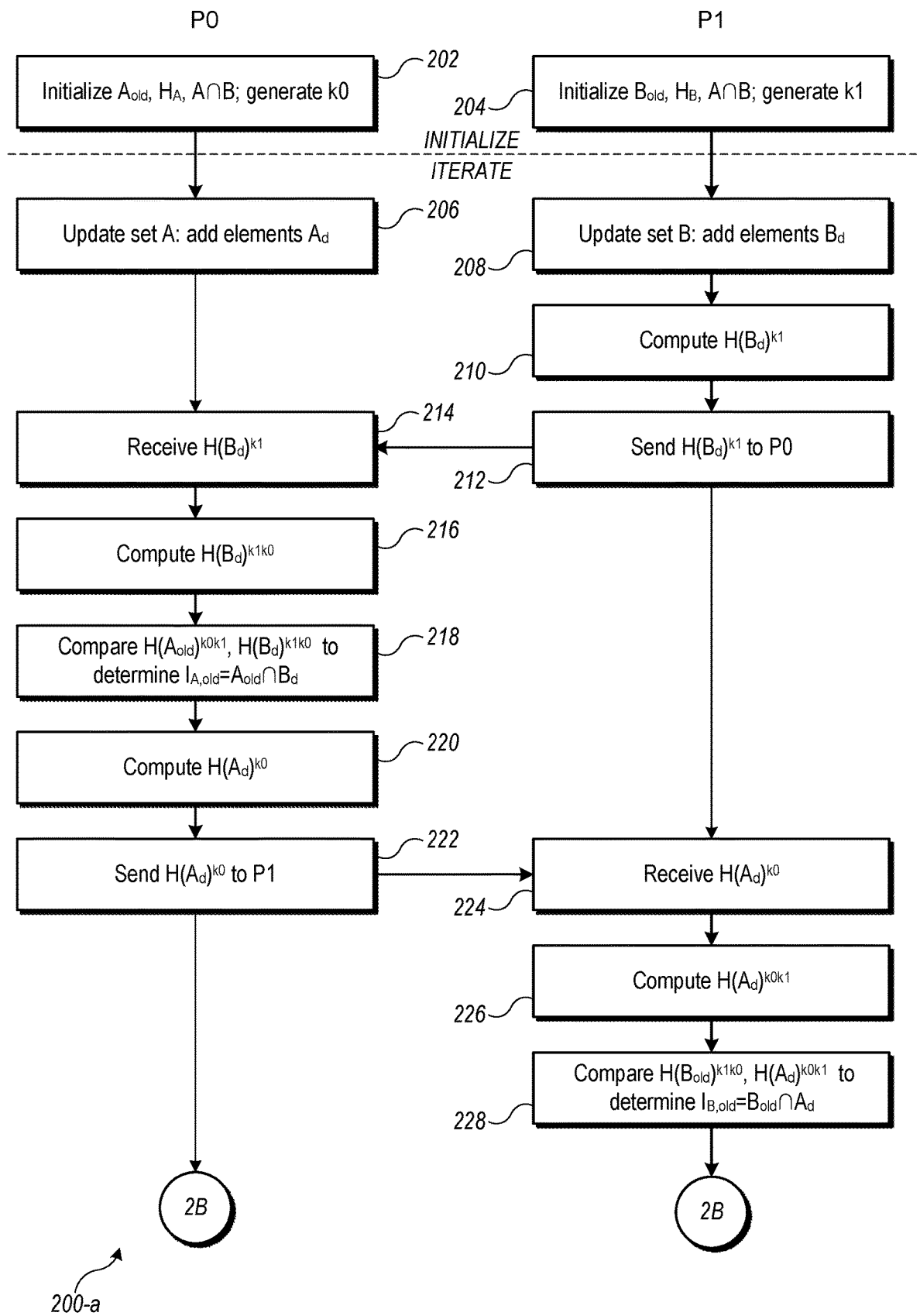
FIGS. 2A-2C show a flow diagram of a process for updating a PSI according to some embodiments.
Figure 2B:
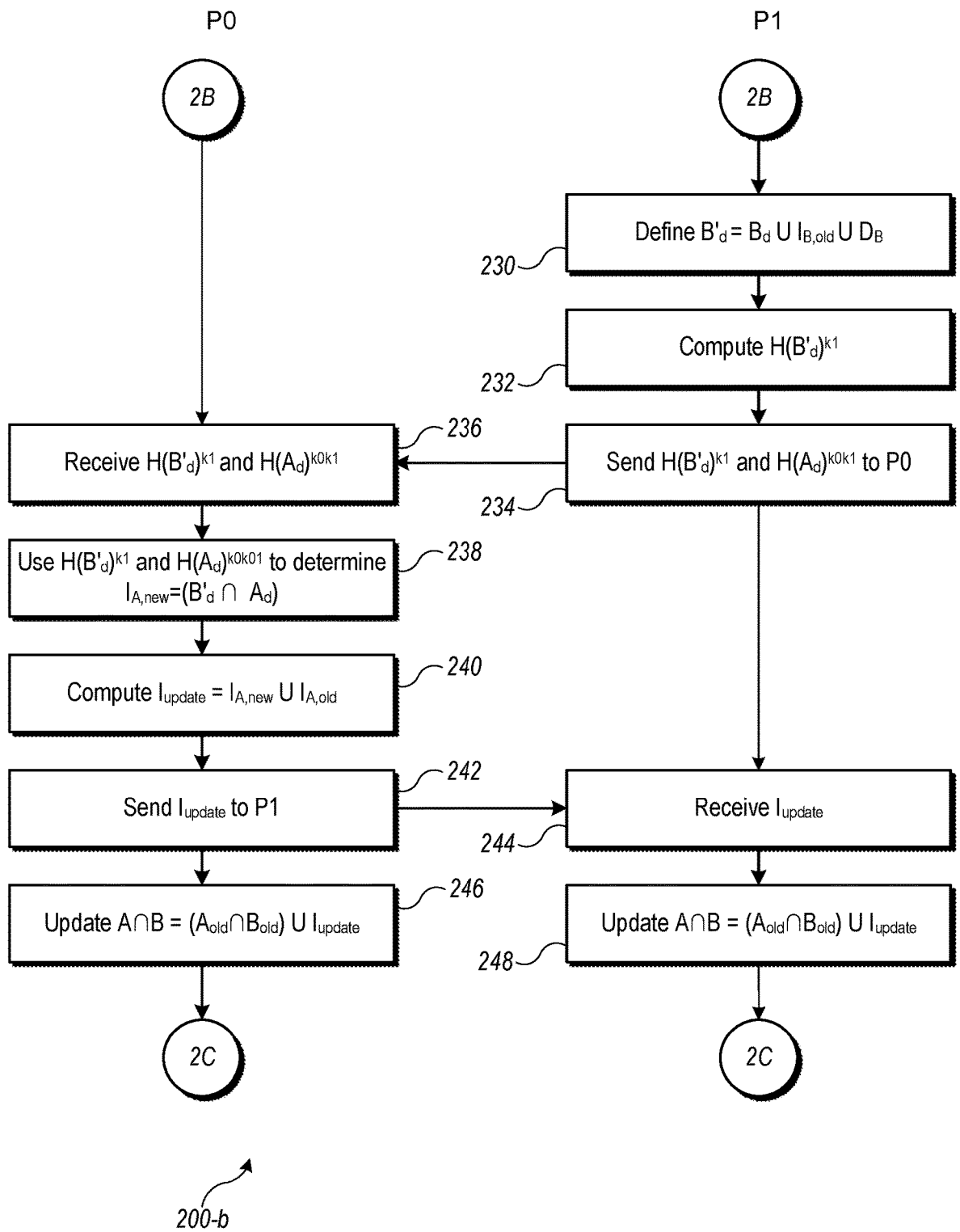
Figure 2C:
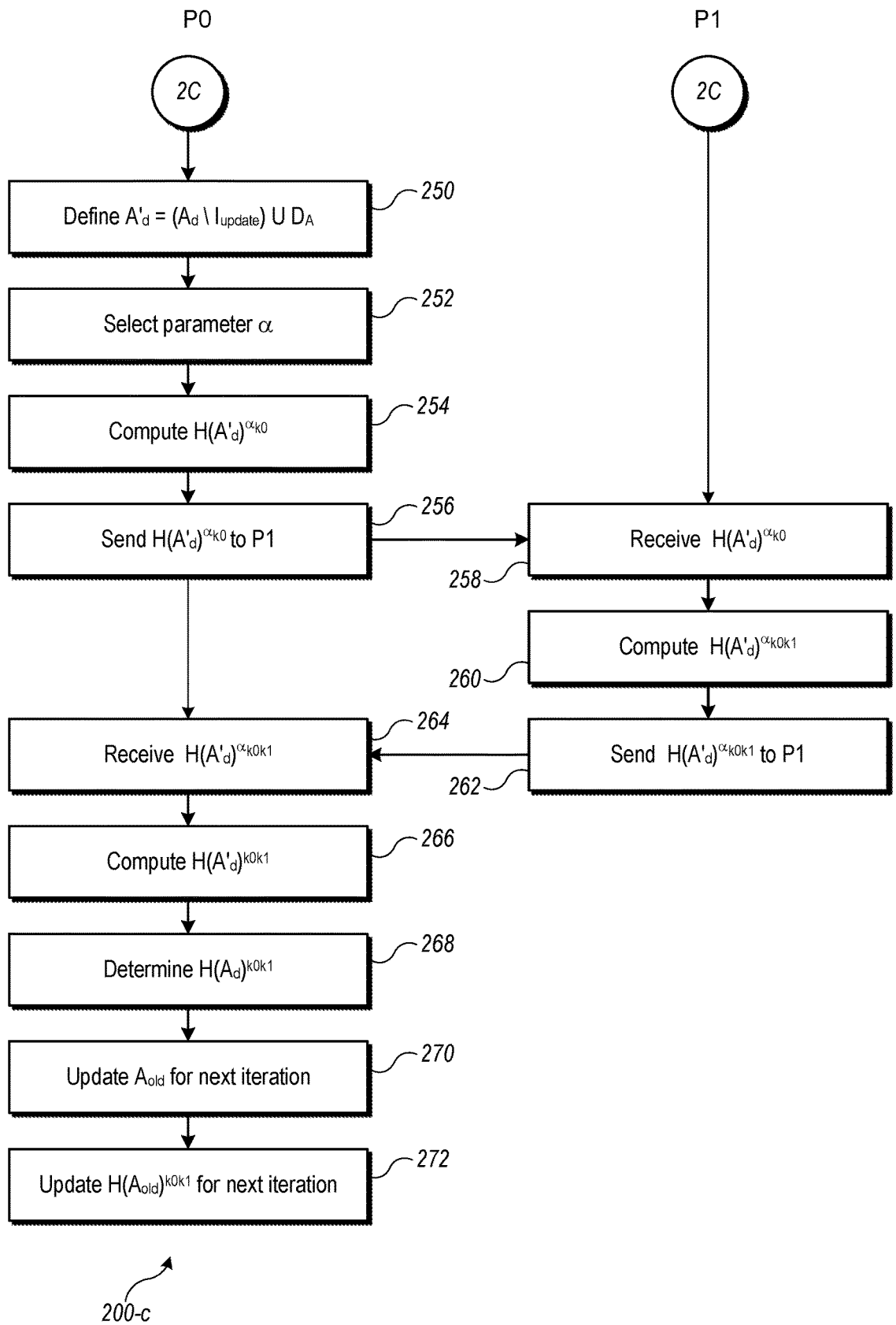

FIGS. 2A-2C show a flow diagram of a process 200 for updating a PSI according to some embodiments. Process 200 can be implemented in a pair of suitably configured computer systems (or in different processes in the same computer system that do not share data access). Process 200 includes an initialization that is performed by each party on the first iteration (day 0); subsequent iterations omit the initialization step. Referring to FIG. 2A, at initialization time, P0's private set A and P1's private set B are both assumed to be empty. Accordingly, at block 202, party P0 can initialize a "residual" subset $A_{old}$, defined as all elements of set A that are not in the intersection A∩B, to the empty set. P0 can also initialize a hash set $H_A = H(A_{old})^{k0k1}$ to the empty set. P0 can also initialize the intersection A∩B to the empty set. During initialization P0 can generate and store a secret exponentiation key k0. Similarly, at block 204, party P1 can initialize a residual subset $B_{old}$, defined as all elements of set B that are not in the intersection A∩B, to the empty set. P1 can also initialize a hash set $H_B = H(B_{old})^{k0k1}$ to the empty set. P1 can also initialize the intersection A∩B to the empty set. P1 can generate and store a secret exponentiation key k1. Blocks 202 and 204 can be performed on the first iteration, when neither party knows the intersection, and omitted on subsequent iterations. As described below, each iteration can result in updating residual subsets $A_{old}$ and $B_{old}$, the corresponding hash sets $H_A$ and $H_B$, and the intersection A∩B; thus, these sets can be but are not necessarily empty at the outset of a particular iteration of process 200.

At blocks 206 and 208, each party updates its private set by adding elements. Accordingly, at block 206, a "new" subset $A_d$ including one or more elements is added to set A, and at block 208, a "new" subset $B_d$ including one or more elements is added to set B. (In some embodiments, one or both of subsets $A_d$ or $B_d$ might be the empty set on some iterations.)

As noted above, to update the intersection A∩B, P0 needs to learn $I_{A,old} = A_{old} \cap B_d$ and $I_{A,new} = A_d \cap (B_{old} \cup B_d)$. For P0 to learn $A_{old} \cap B_d$, at block 210, P1 can hash the set $B_d$ (the newly-added elements of set B) and raise each element to the k1 power. (This can be similar to block 112 of process 100, except that only newly added elements are represented in the hash set.) At bock 212, P1 can send the hash set $H(B_d)^{k1}$ to P0. At block 214, P0 can receive $H(B_d)^{k1}$. From the perspective of P0, hash set $H(B_d)^{k1}$ is an encrypted representation of set $B_d$ that P0 is not able to decrypt. At block 216, P0 can compute a hash set $H(B_d)^{k1k0}$ by raising each element of $H(B_d)^{k1}$ to the k0 power. At block 218, P0 can compare hash set $H(B_d)^{k1k0}$ to its stored hash set $H_A = H(A_{old})^{k0k1}$ to determine $I_{A,old} = A_{old} \cap B_d$.

Similarly, to update the intersection A∩B, P1 needs to learn $I_{B,old} = B_{old} \cap A_d$ and $I_{B,new} = B_d \cap (A_{old} \cup A_d)$. For P1 to learn $B_{old} \cap A_d$, at block 220, P0 can hash the set $A_d$ (the newly-added elements of set A) and raise each element to the k0 power. (This can be similar to block 110 of process 100, except that only newly added elements are represented in the hash set.) At bock 222, P0 can send the hash set $H(A_d)^{k0}$ to P1. At block 224, P1 can receive $H(A_d)^{k0}$. At block 226, P1 can compute a hash set $(A_d)^{k0k1}$ by raising each element of $H(A_d)^{k0}$ to the k1 power. At block 228, P1 can compare $H(A_d)^{k0k1}$ to its stored hash set $H_B = H(B_{old})^{k1k0}$ to determine $I_{B,old} = B_{old} \cap A_d$.

Next, P0 can learn $I_{A,new} = A_d \cap (B_{old} \cup B_d)$ without learning $A_d \cap B_{old}$ or $A_d \cap B_{new}$. For example, the parties can leverage the fact that P1 determines $I_{B,old} = A_d \cap B_{old}$ at block 228. Referring to FIG. 2B, at block 230, P1 can define a "padded" set $B'_d = B_d \cup I_{B,old} \cup D_B$, where $D_B$ is a set of dummy elements, which can have random values. The number of dummy elements can be selected such that the cardinality of set $B'_d$ is $2N_d$, where $N_d$ is a number of added elements each day. In some embodiments, $N_d$ can be a fixed value that does not vary from one iteration to the next; the fixed value can be predetermined for a given implementation based on expectations about the number of elements that will be added to a set each day (or other update period). Use of dummy elements can help to hide information about how many elements were added to a set during each day (or other update period). Use of dummy elements is optional, and in some embodiments, dummy elements can be omitted (in which case $D_B$ can be the null set).

At block 232, P1 can compute a hash set $H(B'_d)^{k1}$ by hashing the padded set $B'_d$ and raising the result to the k1 power. The same hash function used at block 210 can be used. At block 234, P1 can send hash set $H(B'_d)^{k1}$ and hash set $H(A_d)^{k0k1}$ (determined at block 226) to P0.

At block 236, P0 can receive $H(B'_d)^{k1}$ and $H(A_d)^{k0k1}$. At block 238, P0 can use hash sets $H(B'_d)^{k1}$ and $H(A_d)^{k0k1}$ to determine $I_{A,new} = B'_d \cap A_d$. For instance, P0 can compute a hash set $H(B'_d)^{k1k0}$ by raising each element of $H(B'_d)^{k1}$ to the k1 power. P0 can then compare each element of $H(B'_d)^{k1k0}$ to elements of $H(A_d)^{k0k1}$. (These operations can be similar to blocks 122 through 126 of process 100, except that the input sets at block 238 are subsets of sets A and B rather than the entire sets.)

It should be noted that (assuming no false positives due to dummy elements) the operations at blocks 230-238 yield the same result as would be obtained if P1 generated an encrypted representation of $B_d \cup B_{old}$, and sent the result to P0. This is because P0 and P1 have already established $A_{old} \cap B_{old} = \emptyset$, so the only elements of $B_{old}$ that would be added to the intersection A∩B are elements of $A_d \cap B_{old}$. By using set $B'_d$, the computational and communication load is reduced because P1 only computes and sends the $2N_d$ elements of set $H(B'_d)^{k1}$, rather than all elements of $B_{old}$. It should also be noted that P0 does not know whether a given element of set $H(B'_d)^{k1}$ originated from $B_d$, $A_d \cap B_{old}$, or a dummy element, which is consistent with the desired privacy-protecting behavior.

At block 240, P0 can compute an update to the intersection: $I_{update} = I_{A,new} \cup I_{A,old}$, where $I_{A,old}$ is determined at block 218 and $I_{A,new}$ is determined at block 238. At block 242, P0 can send $I_{update}$ to P1, and at block 244, P1 can receive $I_{update}$. At blocks 246 and 248, each party can update the intersection $A \cap B := (A \cap B) \cup I_{update}$.

In some embodiments, additional processing can be performed to prepare for a next iteration of process 200 by updating the residual subsets $A_{old}$ and $B_{old}$ and the corresponding hash sets $H_A = H(A_{old})^{k0k1}$ and $H_B = H(B_{old})^{k1k0}$. FIG. 2C shows an example of updating residual set $A_{old}$ and hash set $H_A$ during process 200 according to some embodiments. It should be understood that a similar process, with the roles of P0 and P1 reversed, can also be used to update residual subset $B_{old}$ and hash set $H_B$. In some embodiments, updating of sets $A_{old}$, $H_A$, $B_{old}$, and $H_B$ can be performed at the beginning of each iteration rather than at the end.

At block 250, P0 can define a set $A'_d$ that consists of elements of $A_d$ that are not in the intersection update computed at block 240, plus a set $D_A$ containing enough dummy elements that the cardinality of set $A'_d$ is $N_d$; that is, $A'_d = (A_d \setminus I_{update}) \cup D_A$. Similarly to dummy set $D_B$ at block 230, dummy elements for set $D_A$ can have random values.

At block 252, P0 can select a parameter a, which can be a random positive integer that is secret to P0. At block 254, P0 can hash the set $A'_d$ and raise the results to the $\alpha k0$ power, thereby computing a hash set $H(A'_d)^{\alpha k0}$. At block 256, P0 can send the hash set $H(A'_d)^{\alpha k0}$ to P1.

At block 258, P1 can receive the hash set $H(A'_d)^{\alpha k0}$. At block 260, P1 can raise each element to the k1 power, thereby computing a hash set $H(A'_d)^{\alpha k0k1}$. At block 262, P1 can send the hash set $H(A'_d)^{\alpha k0k1}$ to P0. (It is assumed that P1 provides the hash set $H(A'_d)^{\alpha k0k1}$ to P0 without changing the order of elements or in some other manner such that P0 can determine which element of $H(A'_d)^{\alpha k0k1}$ corresponds to which element of $H(A'_d)^{\alpha k0}$.)

At block 264, P0 can receive $H(A'_d)^{\alpha k0k1}$. At block 266, P0 can compute $H(A'_d)^{k0k1}$ by raising $H(A'_d)^{\alpha k0k1}$ to the $\alpha^{-1}$ power. At block 268, P0 can update the hash set HA by removing elements corresponding to elements of set $A_{old}$ that were added to the intersection $A \cap B$ and adding elements corresponding to elements of set $A_d$ that were not added to the intersection $A \cap B$. For instance, the updated hash set can be computed as $H(A_{old})_d^{k0k1} := (H(A_{old})^{k0k1} \setminus H(I_{A,old})^{k0k1}) \cup H(A_d \setminus I_{A,old})^{k0k1}$. At block 270, P0 can update set $A_{old}$ for the next iteration of process 200. For instance, the update can be computed as $A_{old} := (A_{old} \setminus I_{A,old}) \cup (A_d \setminus I_{update})$. That is, residual subset $A_{old}$ contains elements of set A that are not in the intersection $A \cap B$.

Although not explicitly shown, a corresponding set of operations can be performed, with the roles of P0 and P1 reversed, to enable P1 to update the residual subset $B_{old}$ and the hash set $H_B$. Thereafter, process 200 can be performed again, starting from blocks 206 and 208, to continue updating the intersection of the private sets A and B.

Process 200 provides the same privacy protection as re-performing a PSI protocol on the entire updated sets. That is, P0 can learn $A_d \cap (B_d \cup B_{[d-1]})$ and can also learn $A_{old} \cap B_d$. However, P0 would not learn $A_d \cap B_d$ or $A_d \cap B_{[d-1]}$. Likewise, P1 can learn $B_d \cap (A_d \cup A_{[d-1]})$ and $B_{old} \cap A_d$ but not $B_d \cap A_d$ or $B_d \cap A_{[d-1]}$. Thus, each party can learn whether each newly-added element of its own set is in the intersection but not whether the newly-added element is in common with the "residual" or "new" subset of the other party's set. Each party can also learn whether any element of its residual subset has entered the intersection due to the addition of new elements by the other party.

It will be appreciated that process 200 is illustrative and that variations and modifications are possible. Operations or blocks described as sequential can be performed in parallel, and the order of operations can be varied to the extent logic permits. In some embodiments, process 200 can be initialized by performing one iteration of a PSI protocol such as process 100, with subsequent iterations being performed according to process 200.

Iterations of process 200 can be performed at any desired frequency, depending on how often it is useful to determine an updated PSI. For instance, in a contact-tracing application, a daily update may be appropriate. In other applications, updates may occur at shorter intervals (e.g., hourly) or longer intervals (e.g., weekly, monthly), or at arbitrary intervals, such as whenever either party has added $N_d$ elements to its set or on request of either party. In instances where the parties are intermittently in contact, the interval between iterations can be a variable amount of time. As long as each party retains its results from the previous iteration, the parties can perform another iteration of process 200 at any time.

In examples described above, each party uses a hash function raised to a (secret) power to encrypt elements of its private set that are shared with the other party. As described, the receiving party can compare the encrypted elements between the two sets but cannot decrypt elements of the other party's set. In some embodiments, the hash function can be replaced with any oblivious pseudorandom function ("OPRF") that creates an encrypted representation of an element, provided that neither party can decrypt elements that were initially encrypted by the other party and provided that each party can obtain corresponding encrypted representations of elements of both sets (such that that if two encrypted representations are the same, then it can be assumed that the elements were the same and that if the encrypted representations are different, then it can be assumed that the elements were different). In some embodiments, the parties can cooperate to provide corresponding encrypted representations. For example, as described above, where the encrypted representations are hash functions raised to a power, one party can apply its (secret) exponent to a hash set received from the other, then return the result. Other OPRF implementations can also involve cooperation between the parties.

As described above, either party can add dummy values to a set being sent to the other party, so that neither party learns how many elements were actually added to the other party's set during each update period. Dummy values can be random numbers generated using any type of random-number (or pseudorandom-number) generator. In some embodiments, there may be a nonzero probability that the dummy value generated by one party coincides with an element of the other party's set, resulting in a "false positive" in the intersection. For instance, if one of the dummy values generated by P1 at block 230 matches an element $a_q$ of P0's set, P0 may include $a_q$ in the intersection $I_{update}$ at block 240. Element $a_q$ would be a false positive. By allowing a sufficiently large numerical range for the dummy values, the probability of a false positive can be reduced to a negligible value. Alternatively, if desired, dummy values can be omitted, which would allow a party to learn how many elements were added to the other party's set on a given day but would prevent dummy values from giving rise to false positives.

Process 200 and other similar processes can provide improved computational efficiency as compared to conventional techniques in which PSI is performed across the entirety of both sets each time an update is desired. As noted above, computing time for full-set PSI protocols scales as $O(N_0+N_d)$, where $N_0$ is the initial size of the sets and $N_d$ is the number of elements added for each update to the PSI. In cases where the incremental addition is much smaller than the initial size of the sets (that is, where $N_0 \gg N_d$), the computing time of repeating the conventional technique scales as $O(N_0)$, even though the amount of added data is much smaller than N.

In contrast, process 200 can operate on subsets of the two sets. Accordingly, the computation time of each update scales as $O(N_d)$. Thus, to the extent that $N_d$ is smaller than the total set size, process 200 can provide improved computational efficiency each time the PSI is updated. (The initial iteration is not necessarily faster since all elements of the sets would be included in that iteration. It is in subsequent iterations that an advantage can be observed.)

Additionally or instead, process 200 can also reduce the communication cost as compared to re-performing conventional PSI over the entire sets. Re-performing conventional PSI incurs a communication cost that grows with $N_0+N_d$. The communication cost of process 200 generally grows with $N_d$ (since communication is required as to added elements) and at worst with $\log N_0$. The largest advantage in communication costs is obtained when the initial set size $N_0$ is larger, the update size $N_d$ is smaller, and the network bandwidth is lower.

In process 200, it is assumed that the sets A and B are updated only by adding elements. In some embodiments, elements can also be deleted from sets A and B. In a scenario referred to as "weak deletion," elements are removed from sets A and B through an expiration process. That is, an element added to set A (or to set B) at iteration i is removed at iteration i+t, where t represents a persistence time that is fixed for a particular application. Accordingly, each party can refresh its set every t iterations. The choice of persistence time t depends on the application and is assumed to be the same for both sets. For instance, in some contact-tracing applications, contacts that occurred more than two weeks ago may no longer be of interest, and persistence time t can be set to 14 days. For other applications, other persistence times can be defined.

According to some embodiments of the invention, an updatable PSI protocol can be provided for updating the intersection of sets with weak deletion. The updatable PSI protocol can involve using multiple instances of a sender streaming PSI ("SSPSI") process. An "SSPSI process" can be defined as a PSI protocol between two parties, referred to as a "sender" and a "receiver," in which only the receiver learns the intersection of the receiver's set with a specific subset of a sender's set. It is assumed that the receiver knows its entire set Y at the outset while the sender initially knows only a subset $X_i$ of its set X. The following is assumed to be public information: (1) the size (number of elements) of the receiver's set Y; (2) the size of the sender's known subset $X_i$; and (3) an upper bound Max on the number of elements in the sender's set X. After the sender has learned an initial subset $X_0$, the parties can perform a one-sided PSI process that results in the receiver learning $X_0 \cap Y$. Thereafter, as the sender learns additional subsets $X_i$, the sender and receiver can perform additional one-sided PSI processes that result, each time, in the receiver learning $X_i \cap Y$.

Figure 3:
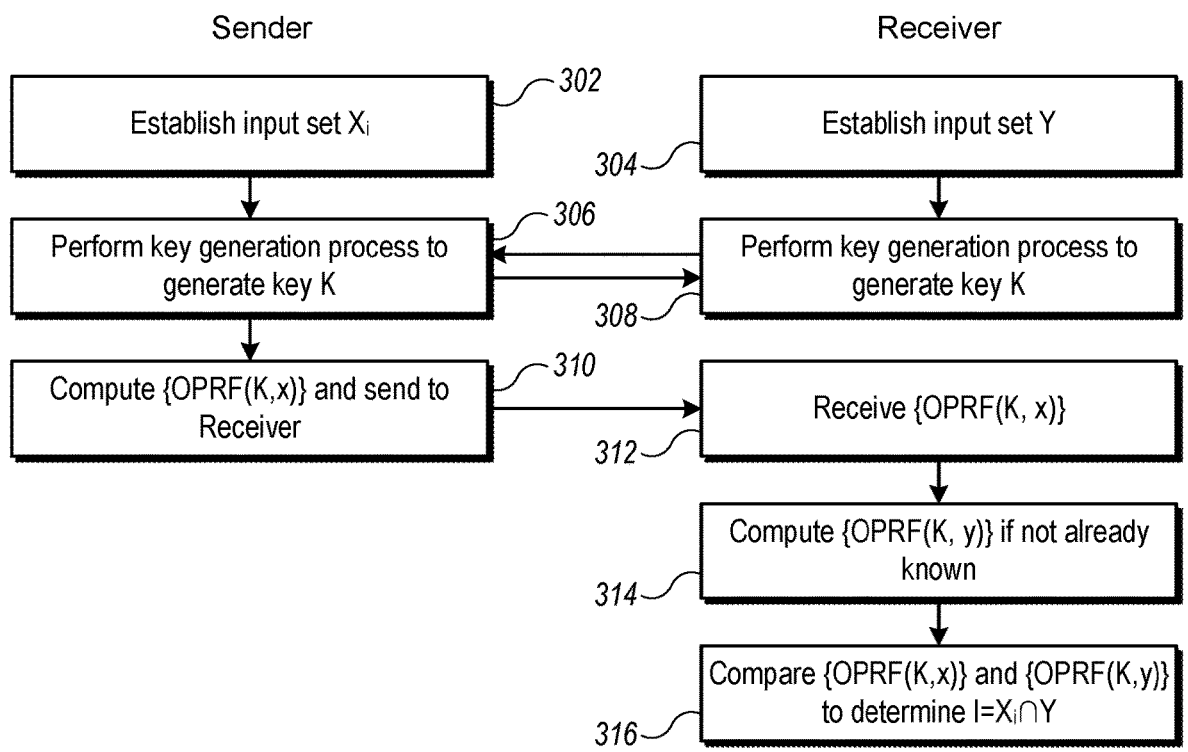
FIG. 3 shows a flow diagram for a sender-streaming PSI process that can be used in some embodiments.

FIG. 3 shows a flow diagram for a sender-streaming PSI process 300 that can be used in some embodiments. Process 300 can be implemented in a pair of suitably configured computer systems (or in different processes in the same computer system that do not share data access). At block 302, the sender establishes an input set $X_i$, which is understood to be a subset of a larger set X. At block 304, the receiver establishes an input set Y. At blocks 306 and 308, the sender and receiver can perform a key-generation process to generate a key K. At block 310, the sender can use the key K and an oblivious pseudorandom function (OPRF) to generate $\{OPRF(K,x)|x \in X_i\}$, which the sender sends to the receiver. (The OPRF is separately computed for each element of set $X_i$.) Any oblivious pseudorandom function can be used, provided that, if $I = X_i \cap Y$, then for any $x \in X_i \setminus I$, $OPRF(K,x)$ appears pseudorandom to the receiver and hence leaks no information about the element x. The key can be chosen as desired; as long as the sender knows the upper bound Max on the number of elements in the sender's set X, a key of appropriate length can be chosen. In some embodiments, a hash function raised to a power, as described above with reference to FIG. 1, can be used, in which case the key K can be understood as the product of the two powers, and the parties cooperate to generate the OPRF sets.) Other appropriate functions can also be used. At block 312, the receiver can receive $\{OPRF(K,x)|x \in X_i\}$. At block 314, the receiver can compute $\{OPRF(K,y)|y \in Y\}$. Where the hash function raised to a power is used, the receiver can provide its hashed elements $\{H(Y)^{Kr}|y \in Y\}$ to the sender so that the sender can compute $\{H(y)^{KrKs}\}$ and return the result to the receiver. At block 316, the receiver can compare $\{OPRF(K,x)|x \in X_i\}$ and $\{OPRF(K,y)|y \in Y\}$ to determine the intersection $I = X_i \cap Y$. If process 300 is repeated for different subsets $X_i$ of the sender's set, it is not necessary to recompute the receiver's encrypted elements $\{OPRF(K,y)|y \in Y\}$ since set Y does not change. Accordingly, block 314 can be performed one time, and the receiver can store $\{OPRF(K,y)|y \in Y\}$ for use in subsequent executions of process 300.

A sender streaming PSI process such as process 300 can be denoted as a function SSPSI(S,R,i) where S denotes the party that acts as sender, R denotes the party that acts as receiver, and i denotes the stream index (or subset $X_i$ of the sender's set) to be processed.

Figure 4A:
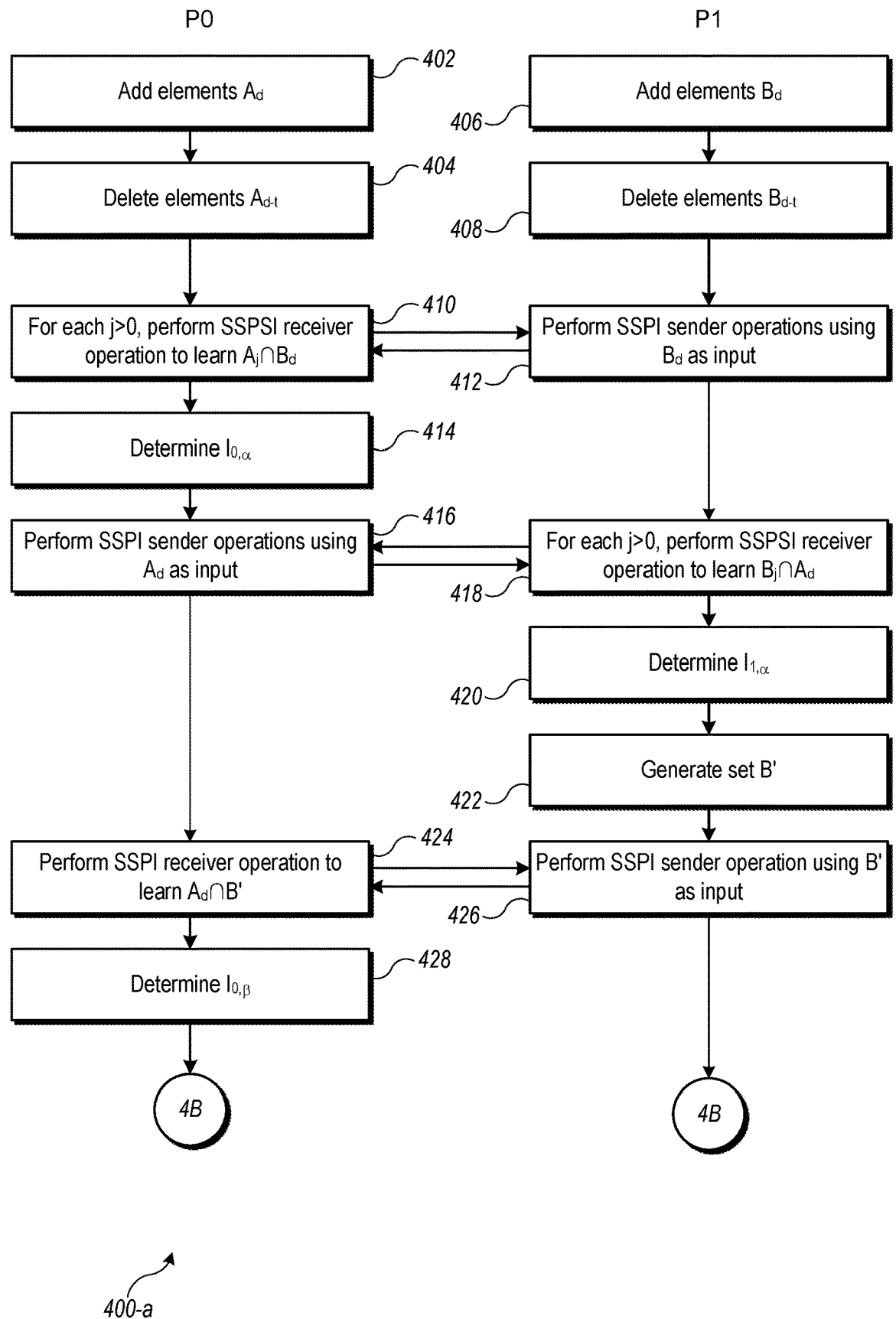
FIGS. 4A and 4B show a flow diagram of a process for updatable PSI with weak deletion according to some embodiments.
Figure 4B:
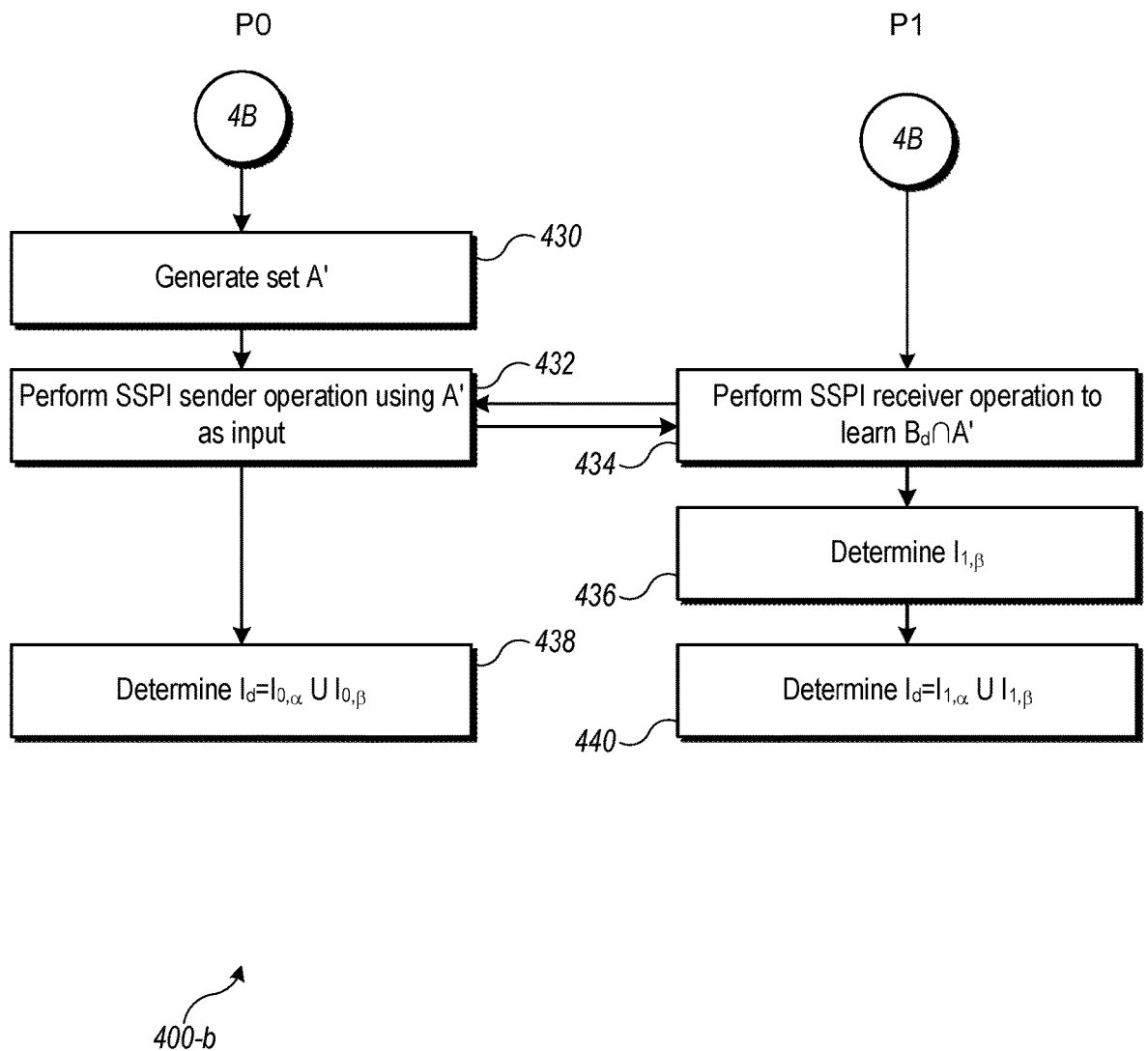

FIGS. 4A and 4B show a flow diagram of a process for updatable PSI with weak deletion according to some embodiments. Process 400 can be implemented in a pair of suitably configured computer systems (or in different processes in the same computer system that do not share data access). Process 400 can exploit the SSPSI process of FIG. 3. Process 400 can be executed iteratively each time an update to the PSI is desired (e.g., daily).

Process 400 can begin with updating the input sets. P0 updates set A by adding a set $A_d$ at block 402 and deleting a set $A_{d-t}$ at block 404. Thus, for any given iteration, set A can include subsets $A_{d-t+1}, \ldots, A_{d-1}, A_d$. (For any case where index i≤0, $A_i$ can be the null set.) Similarly, P1 updates set B by adding a set $B_d$ at block 406 and deleting a set $B_{d-t}$ at block 408. Thus, for any given iteration, set B can include subsets $B_{d-t+1}, \ldots, B_{d-1}, B_d$. (For any case where index i<0, $B_i$ can be the null set.)

In blocks 410-414, P0 can determine a partial intersection $$I_{0,a} = \bigcup_{j=(d-t+1)}^{d-1} (A_j \cap B_d). \tag{1}$$

More specifically, at blocks 410 and 412, for each positive integer j in the range from (d−t+1) to (d−1), an instance of SSPSI according to process 300 can be performed with P1 as the sender and P0 as the receiver. The receiver set in a given instance is $A_j$ and the sender subset is $B_d$. In this manner, P0 can learn $A_j \cap B_d$ for each j. At block 414, P0 can compute the union $I_{0,\alpha}$ according to Eq. (1). It should be noted that $I_{0,\alpha}$ is similar to $I_{A,old}$ in process 200, except that elements from deleted subsets of set A are not included.

Similarly, in blocks 416-420, P1 can determine a partial intersection $$I_{1,\alpha} = \bigcup_{j=(d-t+1)}^{d-1} (B_j \cap A_d). \quad (2)$$

More specifically, at blocks 416 and 418, for each positive integer j in the range from (d−t+1) to (d−1), an instance of SSPSI according to process 300 can be performed with P0 as the sender and P1 as the receiver. The receiver set is $B_j$ and the sender subset is $A_d$. In this manner, P0 can learn $B_j \cap A_d$ for each j. At block 420, P1 can compute the union $I_{1,\alpha}$ according to Eq. (2).

In blocks 422-428, P0 can determine the partial intersection $$I_{0,\beta} = A_d \cap (\cup_{j=d-t+1}^{d} B_j). \quad (3)$$

More specifically, at block 422, P1 can generate a set B', which can be defined as $$B' = B_d \cup I_{1,\alpha} \cup D_{Bd} \quad (4)$$

where $I_{1,\alpha}$ is given by Eq. (2) and $D_{Bd}$ is a set consisting of dummy random elements (similar to dummy random elements used in process 200) so that the cardinality of set B' is equal to $2N_d$. At blocks 424 and 426, an additional instance of SSPSI according to process 300 can be performed with P0 as the receiver and P1 as the sender. The receiver set is $A_d$, and the sender set is B'. In this manner, P0 can learn $A_d \cap B'$, which is (ignoring dummy elements) the same as Eq. (3). Accordingly, P0 can determine $I_{0,\beta}$ at block 428. It should be noted that $I_{0,\beta}$ is similar to $I_{A,new}$ in process 200, except that elements from deleted subsets of set B are not included.

As with blocks 230-238 of process 200 described above, the SSPSI process at blocks 424 and 426 yields the same result as would be obtained if P1 used set B as the sender set, but with reduced computational load, which is possible because P1 has already determined which elements of subsets $B_{d-t+1}, \ldots, B_{d-1}, B_d$ intersect with $A_d$.

Similarly, referring to FIG. 4B, in blocks 430-436, P1 can determine the partial intersection $$I_{1,\beta} = B_d \cap (\cup_{j=d-t+1}^{d} A_j). \quad (5)$$

More specifically, at block 430, P0 can generate a set A', which can be defined as $$A' = A_d \cup I_{0,\alpha} \cup D_{Ad} \quad (6)$$

where $I_{0,\alpha}$ is given by Eq. (1) and $D_{Ad}$ is a set consisting of dummy random elements (similar to dummy random elements used in process 200) so that the cardinality of set A' is equal to $2N_d$. At blocks 432 and 434, an additional instance of SSPSI according to process 300 can be performed with P1 as the receiver and P0 as the sender. The receiver set is $B_d$, and the sender set is A'. In this manner, P1 can learn $B_d \cap A'$, which is (ignoring dummy elements) the same as Eq. (5). Accordingly, P1 can determine $I_{1,\beta}$ at block 436. Like the SSPSI process at blocks 424 and 426, the SSPSI process at blocks 432 and 434 yields the same result as would be obtained if P0 used set A as the sender set, but with reduced computational load.

At blocks 438 and 440, P0 and P1 can each determine the intersection $I_d$ for update d. At block 438, P0 determines $I_d = I_{0,\alpha} \cup I_{0,\beta}$. Since $I_{0,\alpha}$ is the intersection of P1's "new" elements ($B_d$) with P0's "old" (but unexpired) elements and $I_{0,\beta}$ is the intersection of P0's "new" elements $A_d$ with P1's complete set B, the union of these two sets is the intersection $A \cap B$. At block 440, P1 determines $I_d = I_{1,\alpha} \cup I_{1,\beta}$. Since $I_{1,\alpha}$ is the intersection of P0's "new" elements ($A_d$) with P1's "old" (but unexpired) elements and $I_{1,\alpha}$ is the intersection of P1's "new" elements $B_d$ with P0's complete set A, the union of these two sets is also the intersection $A \cap B$.

Process 400 can be performed iteratively (e.g., daily) to repeatedly update the sets and the PSI. The key (or keys) used in each iteration can be generated independently, so that the OPRF outputs during the SSPSI processes can be different even if an input is the same. At each iteration P0 learns which of the old elements of set A are in common with newly added elements of set B but does not learn which of the updates to set B matches any new element of $A_d$ that is added to the intersection. P1 learns corresponding information. Neither party learns $A_d \cap B_{d-t}$ or $B_d \cap A_{d-t}$. (That is, the parties do not learn the intersection of elements deleted from either set with elements added to either set.)

It will be appreciated that process 400 is illustrative and that variations and modifications are possible. Operations or blocks described as sequential can be performed in parallel, and the order of operations can be varied to the extent logic permits. Other PSI processes that allow one party to determine a PSI can be substituted for sender-streaming PSI process 300 of FIG. 3. Iterations can be performed at any desired frequency, depending on how often it is useful to determine an updated PSI. For instance, in a contact-tracing application, a daily update may be appropriate. In other applications, updates may occur at shorter intervals (e.g., hourly) or longer intervals (e.g., weekly, monthly), or at arbitrary intervals, such as whenever either party has added $N_d$ elements to its set or on request of either party. In instances where the parties are intermittently in contact, the iteration interval can be a variable amount of time (e.g., all updates since last time the intersection was updated).

As described above, dummy values can be used to pad the updated sets to a fixed size so that neither party learns how many elements were actually added to the other party's set during each iteration. Dummy values can be random numbers and the range of values can be chosen such that the probability of false positives is negligible. Alternatively, if desired, dummy values can be omitted, which would allow a party to learn how many elements were added to the other party's set on a given day but would prevent false positives due to dummy elements.

In some embodiments, it may be useful to keep an element in a set for longer than the persistence time t. For instance, in the case of contact tracing, P0 (or P1) may encounter the same contact on multiple days. Retaining elements in the set for a longer period can be managed, e.g., by adding the same contact to P0's set on each day that contact is encountered. Other techniques can also be used.

Like process 200, process 400 can provide improved computational efficiency and communication efficiency as compared to conventional techniques in which PSI is performed across the entirety of both sets each time an update is desired. In some embodiments, computation time and communication cost for process 400 each scale as $O(N_d t)$.

In the examples described above, both parties can determine the updated intersection at each iteration. In some embodiments it may be desirable for only one party to determine the intersection. For example, in some client-server applications, a server may maintain a large private set, and a client may determine the intersection of its (typically smaller) private set with the server's private set. To facilitate comparisons against a large set, a first party P1 (e.g., a server) can provide an encrypted database that the first party can update without regenerating the entire database. The database can have a tree structure that can be updated by the first party using a technique that provides no information about the original content. A second party P0 (e.g., a client) can obliviously search the encrypted database to find matches to its private set. An additively homomorphic encryption protocol can be used.

In some embodiments, a one-sided updatable PSI protocol can be implemented using fully homomorphic encryption ("FHE"). For example, P1 can use an FHE algorithm to encrypt set B using a secret key sk1 and can provide $Enc_{sk1}(B)$ to P0. P0 can store $Enc_{sk1}(B)$ and can use set A to homomorphically compute $Enc_{sk1}(A \cap B)$ without knowing sk1. Both parties can then run a secure two-party computation (2PC) protocol where P0's input is $Enc_{sk1}(A \cap B)$ and P1's input is the secret key sk1, from which P0 can learn the output $A \cap B$. When set A is updated by adding set $A_d$ and set B is updated by adding set $B_d$, P1 can update the encrypted database by sending $Enc_{sk1}(B_d)$ to P0, and P0 can learn $A_d \cap (B \cup B_d)$ with communication growing with $N_d$ (the number of added elements). However, P0's homomorphic computation grows with N (the total number of elements in set B). In addition, FHE algorithms can be computationally expensive.

In some embodiments, additional efficiency gains can be achieved. For example, P1's database can be maintained using a tree structure in which, on any given update cycle, P1 updates only one level of the tree and P0 queries on only one path of the tree. The computational cost (amortized over update cycles) grows with the depth of the tree, which can be logarithmic in N rather than linear. Further efficiency gains can be achieved by using additively homomorphic encryption ("AHE") rather than FHE for the 2PC protocol.

Where the sets are updated only by addition of elements, in order to learn the updated intersection $I_d$ on each Day d, P0 only needs to learn the update set $I_{update} = I_d \backslash I_{d-1}$. Similarly to examples described above, $I_{update}$ can be split into two disjoint sets $I_{A,old}' = A_{old} \cap B_d$ and $I_{A,new}' = A_d \cap B_{[d]}$. P0 can learn $I_{A,old}'$ using a protocol similar to process 200. To learn $I_{A,new}'$, P0 can use an updated tree provided by P1 and can query a relatively small set of elements of the updated tree that could possibly contain new elements matching elements added to set A. In the one-sided protocol, it is assumed that P1 does not learn $A_d \cap B_{old}$, and the tree structure can represent all elements of set B.

The binary tree structure can be implemented as follows. Initially, the tree can be empty. Each node of the tree has a maximum capacity $O(\sigma)$, where $\sigma$ can be chosen based on the number $N_d$ of added elements in a given day. In some embodiments, $N_d = \sigma$ and the node capacity is $4\sigma$. On each day when there are new elements added to P1's set, P1 inserts the new elements into the tree. Initially, new elements can be inserted into the root (or first) node of the tree. When the root reaches maximum capacity, then P1 pushes the elements in the root, along with the new elements, into the second level of the tree (which has two nodes). If the second level has any full nodes, then P1 pushes all elements down to the third level (which has four nodes). The process can continue: if the first L levels of the tree contains any full node, then P1 pushes all the elements in the first L levels, along with the new elements, to the (L+1) level of the tree and empties the first L levels. For a particular level, an element Y is put into a (pseudo-)random node of that level, determined by the output of a hash function $H_2(Y)$.

Figure 5:
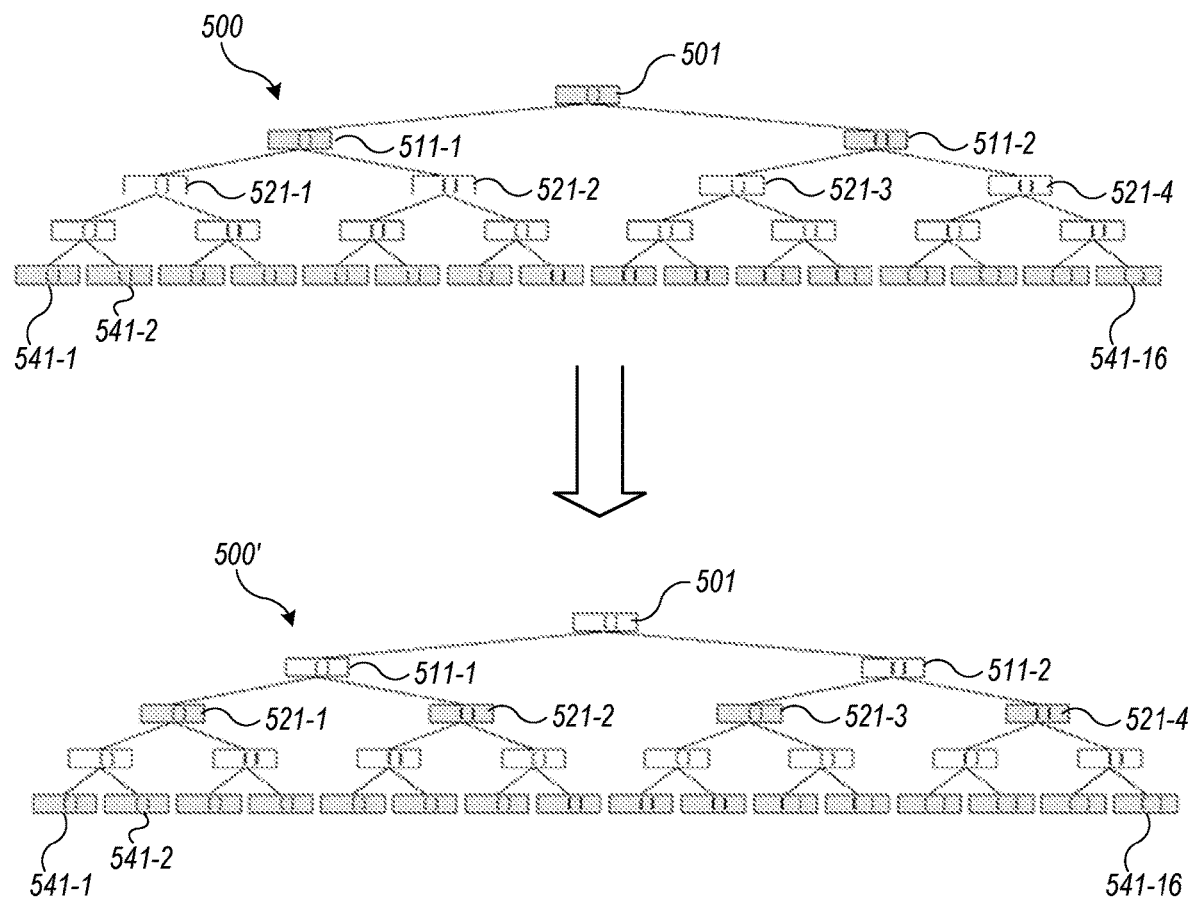
FIG. 5 shows an example of a tree-updating process according to some embodiments.

To make the update process data-oblivious to P0, P1 can modify its behavior such that pushing elements into the next level does not happen when a node is exactly full. Instead, P1 can perform the pushing operation in a predetermined manner that depends only on P1's set sizes (which are public to P0) and for which the probability of any node reaching full capacity is negligible. FIG. 5 shows an example of a tree-updating process according to some embodiments. Tree 500 shows the state of the binary tree prior to the update for day d=20. White nodes are empty, and gray nodes are non-empty. Thus, root node 501 and level-1 nodes 511-1, 511-2 contain elements. The next two levels are empty, but level-4 nodes 541-1 through 541-16 contain elements. Updated tree 500' shows the state of the binary tree after the update for day d=20. All elements from root node 501 have been pushed to level-1 nodes 511-1 and 511-2, after which all elements from level-1 nodes 511-1 and 511-2 have been pushed to level-2 nodes 521-1 through 521-4, which were previously empty, and further pushing is not needed. Elements remain in level-4 nodes 541-1 through 541-16.

After updating the tree structure as shown in FIG. 5, P0 can pad every updated node to its maximum capacity using dummy elements, then send the updated nodes in encrypted form to P0. P0 can use the encrypted tree structure in an updatable PSI protocol. For example, for each $x \in A_d$, P0 can locate a root-to-leaf path that could possibly contain x, e.g., by computing $H_2(x)$ for each level that has at least one occupied node. Using additively homomorphic encryption, and with the help of P1, P0 can learn whether x is contained in any node of the path without learning any other information and without leaking x to P1.

Figure 6:
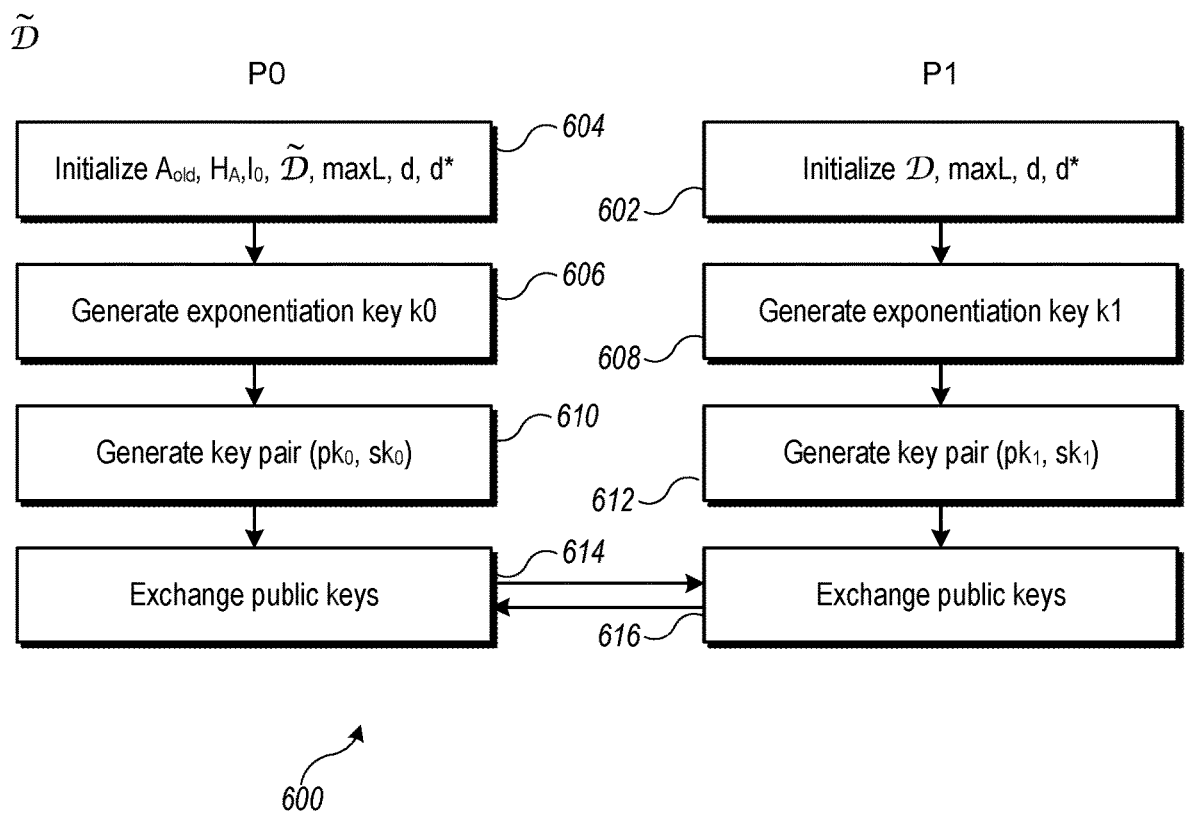
FIGS. 6 and 7A-7C show flow diagrams of a process implementing a one-sided updatable PSI process using an encrypted tree structure according to some embodiments.

FIGS. 6 and 7A-7C show flow diagrams of a process implementing a one-sided updatable PSI process using an encrypted tree structure according to some embodiments. FIG. 6 shows an initialization process 600 that can be performed once to prepare the initial sets. FIG. 7 shows an update process 700 that can be performed for each update cycle. Processes 600 and 700 can be implemented in a pair of suitably configured computer systems (or in different processes in the same computer system that do not share data access).

Referring to FIG. 6, initialization process 600 includes initialization of parameters that will be used in process 700. For instance, at block 602, P1 can initialize a tree structure D that will be used to represent P1's set B. Tree structure D can consist of sets $D_i[j]$, where the subscript i denotes a level of a binary tree and j denotes a node within level i. The number of levels i can be as large as desired (put differently, the range of i can include all non-negative integers), and each level i has $2^i$ nodes (put differently, for level i, the range of j can be $\{0, 1, \ldots, 2^{i-1}\}$. Initially the tree structure is empty, and each $D_i[j]$ can be initialized to the empty set. P1 can also initialize a parameter maxL, which represents the current depth of the tree, to zero. P1 can also initialize an update-cycle counter d to zero and a secondary cycle counter d* to 1.

At block 604, P0 can initialize a residual subset $A_{old}$ (representing elements of set A that are not in the intersection $A \cap B$) to the empty set. P0 can also initialize a hash set $H_A$ to the empty set. As will become apparent, hash set $H_A$ can be defined used similarly to hash set $H_A$ in embodiments described above. P0 can also initialize the intersection set $I_{d=0}$ to the empty set. P0 can also initialize an encrypted tree structure $\widetilde{\mathcal{D}}$, which is used to store an encrypted tree structure provided by P1. Like the (unencrypted) tree structure $\mathcal{D}$, encrypted tree structure $\widetilde{\mathcal{D}}$ can consist of a number of sets (nodes) $\widetilde{\mathcal{D}}_i[j]$, each of which is initialized to the empty set. P0 can also initialize a parameter maxL (which represents the current depth of the tree) to zero. P0 can also initialize an update-cycle counter d to zero and a secondary cycle counter d* to 1. (Other values can be used, as long as P0 and P1 agree on the current value of d.)

At block 606, P0 can generate an exponentiation key k0, and at block 608, P1 can generate an exponentiation key k1. The exponentiation keys can be similar or identical to exponentiation keys generated in process 200 described above. Each party can hold its exponentiation key as a secret.

At block 610, P0 can generate a key pair $(pk_0, sk_0)$ for an additively homomorphic public-key encryption scheme, with $pk_0$ as a public key and $sk_0$ as the corresponding secret (private) key. At block 612, P1 can generate a key pair $(pk_1, sk_1)$ for an additively homomorphic public-key encryption scheme, with $pk_1$ as a public key and $sk_1$ as the corresponding secret (private) key. Any AHE scheme can be used, provided that P0 and P1 use the same scheme (with different key pairs). At blocks 614 and 616, P0 and P1 can exchange public keys. At this point, P0 and P1 are ready to begin updating their sets using process 700 of FIGS. 7A-7C.

Figure 7A:
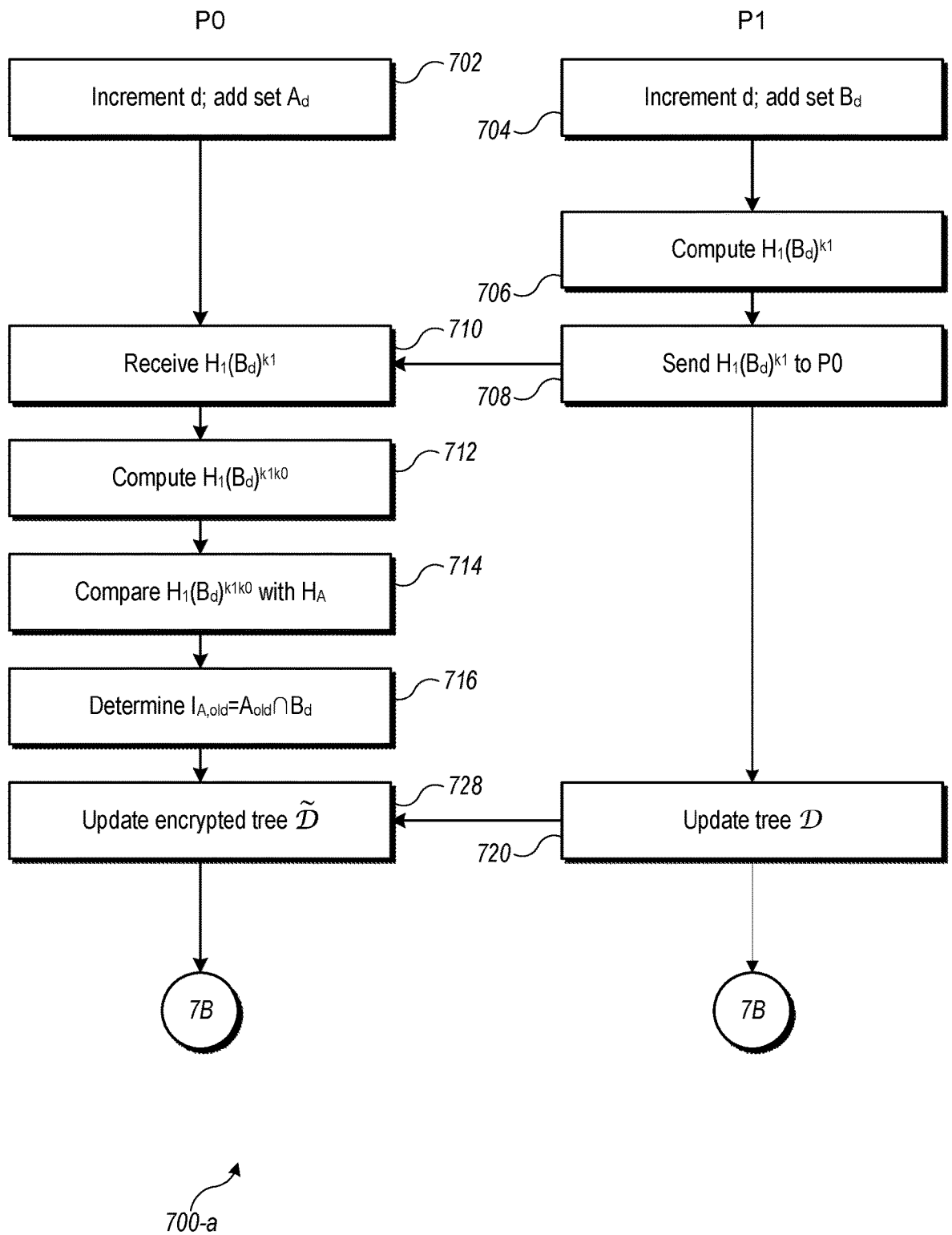

Referring to FIG. 7A, each party updates its set each day (or each update cycle of arbitrary length) by adding a number $N_d = \sigma$ elements. Accordingly, for day d, at block 702, P0 can increment its update-cycle counter d (e.g., by adding 1) and can add a new subset $A_d$ (also sometimes denoted as $A_{new}$) to its private set A. Similarly, at block 704, P1 can increment its update-cycle counter d (e.g., by adding 1) and can add set $B_d$ to its private set B. In some embodiments, the number of elements added to either set can be less than $N_d = \sigma$, and either party can use dummy elements (similar to dummy elements described above) to conceal the number of elements added.

In blocks 706-716, P0 can learn $A_{old} \cap B_d$ using a technique similar to the PSI processes described above. For example, at block 706, P1 can compute a hash set $H_1(B_d)^{k1}$, analogously to block 210 of process 200 (FIG. 2A); that is, for each element of set $B_d$, the hash function is applied and the result is raised to the k1 power. At block 708, P1 can send the hash set $H_1(B_d)^{k1}$ to P0. At block 710, P0 can receive the hash set $H_1(B_d)^{k1}$. At block 712, P0 can compute hash set $H_1(B_d)^{k1k0}$ by raising each element of $H_1(B_d)^{k1}$ to the k0 power. At block 714, P0 can compare the hash set $H_1(B_d)^{k1k0}$ to its "old" hash set $H_A$. It should be noted that on the first iteration, HA can be the empty set, and elements can be added to $H_A$ at the end of each update cycle, as described below. At block 716, P0 can determine the partial intersection $I_{A,old} = A_{old} \cap B_d$.

Figure 7B:
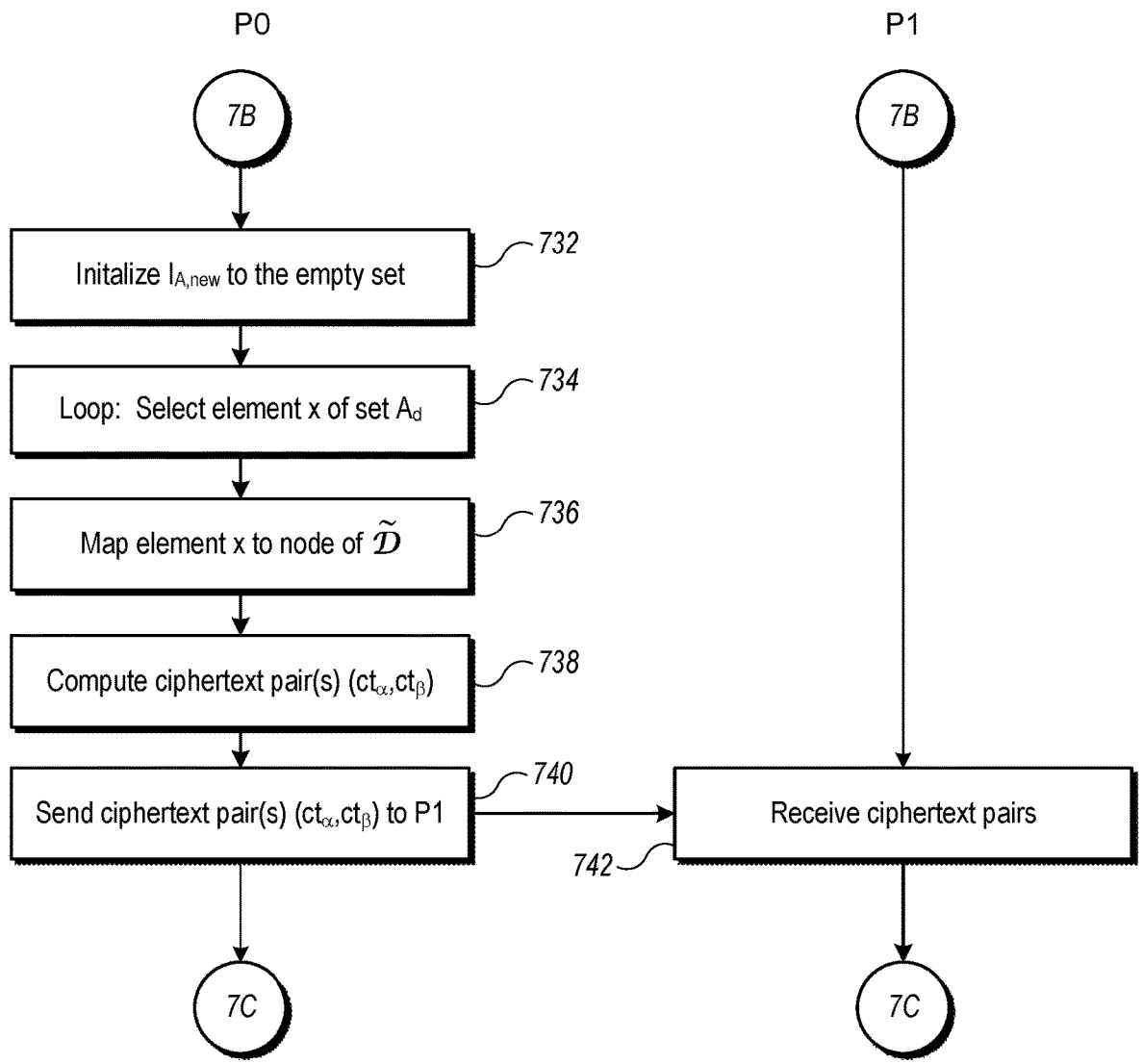
Figure 8:
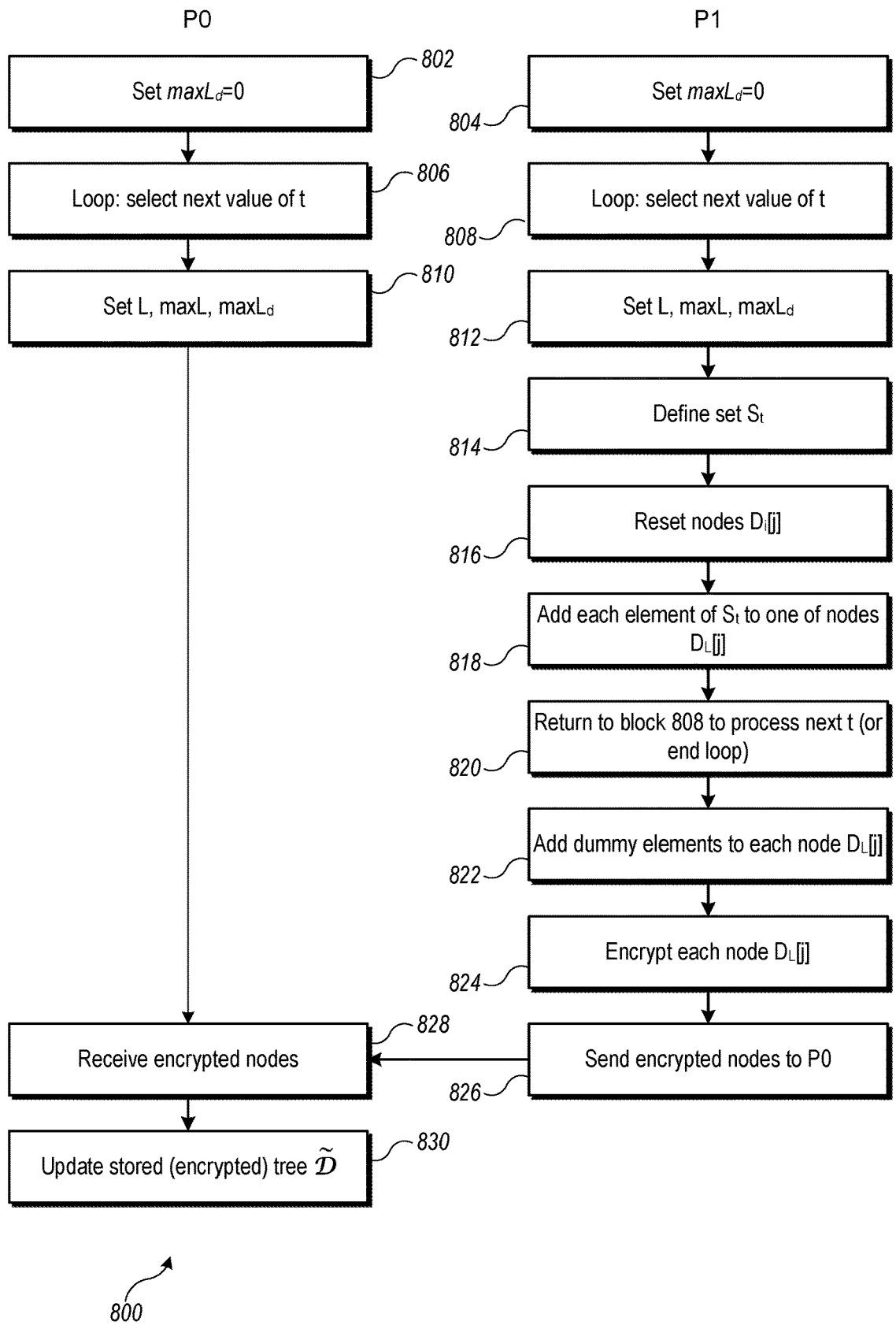
FIG. 8 shows a flow diagram of a process that can be used to update a binary tree structure according to some embodiments.

Referring to FIG. 7B, in blocks 720-756, P0 can learn $A_{new} \cap B$ (where $B = \cup_{k=0}^{d} B_k$) using an encrypted tree structure provided by P1. At block 720, P1 can update its tree structure $\mathcal{D}$, encrypt the updated tree structure, and send the encrypted tree structure $\widetilde{\mathcal{D}}$ (or updates thereof) to P0, and P0 can update its (stored) encrypted tree structure at blocks 728. FIG. 8 shows a flow diagram of a process 800 that can be used to update the tree structure according to some embodiments. Process 800 can be applied at blocks 720 and 728.

At blocks 802 and 804, each party can set a level counter $maxL_d$ to zero. At blocks 806 and 808 a processing loop is entered using a loop counter t, where $t \in \{d^*, d^*+1, \ldots, (d^*+N_d/\sigma-1)\}$; at blocks 806 and 808, each party can select the next value of t. At blocks 810 and 812, each party can determine a level number L corresponding to loop counter t. For example, a function LS1(d) can be defined that returns the position of the least significant 1 in the binary representation of d. In other words, if $n = \Sigma_{i=0}^{k} b_i$, then $LS1(n) := \min\{i : b_i = 1\}$. For example, $LS1(7) = 0$ and $LS1(12) = 2$. At blocks 810 and 812, each party can set $L = LS1(d)$ and $maxL = \max\{L, maxL\}$, and $maxL_d = \max\{L, maxL_d\}$.

At blocks 814-822, P1 can update its tree structure $\mathcal{D}$ for loop counter t. For example, P1 can split the set of added elements $B_d$ into disjoint subsets: $B_d = \{Y_{d^*}, Y_{d^*+1}, \ldots, Y_{d^*+N_d/\sigma-1}\}$. If $B_d$ includes $N_d$ elements, then each subset $Y_i$ can include $\sigma$ elements. At block 814, P1 can define a set $S_t = (\cup_{i=0}^{L-1} \cup_{j=0}^{2^i-1} \mathcal{D}_i[j]) \cup Y_t$. At block 816, P1 can reset nodes of the tree. For instance, for each $i \in \{0, 1, \ldots, L\}$ and for each $j \in \{0, 1, \ldots, 2^i-1\}$, P1 can set set $\mathcal{D}_i[j] = \emptyset$ (empty set).

At block 818, P1 can add each element $b \in S_t$ to a node in the tree. For example, P1 can compute a series of hashes $j = H_2(b)[1 \ldots L]$, where $H_2(\bullet)$ is a level-specific hash function that can be different from $H_1(\bullet)$ used in blocks 706-716. In some embodiments, if adding element b to node $\mathcal{D}_L[j]$ causes node $\mathcal{D}D_L[j]$ to exceed its size limit (which can be, e.g., $4\sigma$), then process 800 aborts. It can be shown that for a size limit of $4\sigma$, the probability of the size of any node $\mathcal{D}_L[j]$ exceeding the size limit is negligible, provided that the hash function $H_2(\bullet)$ is modeled as a random oracle such that any element $b \in S$ is equally likely to be placed in any one of the nodes at level L. (To make the probability even smaller, the size limit can be increased, although increasing the size limit adds to the amount of data that is sent from P1 to P0.) If adding element b to node $\mathcal{D}_L[j]$ does not cause node $\mathcal{D}_L[j]$ to exceed its size limit, then P1 can add element b to node $\mathcal{D}_L[j]$. In some embodiments, element b can be added to the end of the elements in node $\mathcal{D}_L[j]$. Alternatively, Cuckoo hashing (as defined above) can be used to store elements in each nod. For example, three hash functions ($CuH_1, CuH_2, CuH_3$) can be selected. Each node $\mathcal{D}_L[j]$ is represented as a collection of y bins. A small stash is also associated with each node. Each element b can be inserted into one of the y bins (or the stash) at any given node depending on the contents of bins $CuH_1(b), CuH_2(b), CuH_3(b)$. Similarly, elements from the stash can be used when defining set $S_t$ in block 814 and setting $D_t[j] = \emptyset$ in block 816. At block 820, P1 can either return to block 808 to continue the loop for the next value of counter t or end the loop and proceed to block 822.

At block 822, for each $j \in \{0, 1, \ldots, 2^L-1\}$, P1 can construct a node $D'_L[j]$ of size $4\sigma$ by padding $D_L[j]$ with dummy elements (which can be random elements as described above). At block 824, P1 can encrypt the tree $\widetilde{\mathcal{D}}$. For example, P1 can encrypt each node $\widetilde{\mathcal{D}}'_L[j]$ using public key $pk_1$ to generate an encrypted node $\widetilde{\mathcal{D}}'_L[j] = Enc_{pk1}(\widetilde{\mathcal{D}}_L[j])$, where $Enc_K(m)$ denotes an asymmetric encryption function that uses a key K to encrypt a message m. At block 826, P1 can send the encrypted nodes $\{\widetilde{\mathcal{D}}'_L[j]\}_{j \in \{0, 1, \ldots, 2^{L-1}\}}$ to P0.

At block 828, P0 can receive the encrypted nodes. At block 830, P0 can update its stored encrypted tree $\widetilde{\mathcal{D}}$. For example, P0 can first clear node $\widetilde{\mathcal{D}}_i[j]$ for each $i \in \{0, 1, \ldots, L\}$ and for each $j \in \{0, 1, \ldots, 2^i-1\}$. Then, for each $j \in \{0, 1, \ldots, 2^L-1\}$, P0 can set $\widetilde{\mathcal{D}}_L[j] = \widetilde{\mathcal{D}}'_L[j]$.

Referring again to FIG. 7B, at block 732, P0 can initialize the partial intersection $I_{A,new}$ to the empty set. At this point, P0 and P1 begin a processing loop (blocks 734-758) to determine which elements of set $A_d$ are to be added to the partial intersection $I_{A,new}$. The processing loop can be driven by P0, with P1 acting as a server. At block 734, P0 can select an element x from set $A_d$ to be tested. At block 736, P0 can map element x to one or more nodes of encrypted tree $\widetilde{\mathcal{D}}$ to which element x maps. For example, for each $i \in \{0, 1, \ldots, \text{maxL}\}$, P0 can compute a hash function $j = H_2(x)_{[1\ldots i]}$. If $\widetilde{\mathcal{D}}_i[j]$ is not empty, then a match is found. It should be noted that P0 does not have the secret key $sk_1$ to decrypt the nodes $\widetilde{\mathcal{D}}_i[j]$. However, the encryption does not affect whether a node of the tree is empty or non-empty, so P0 can determine whether element x matches an occupied node without knowing any of the elements in the nodes.

Matching an occupied node does not, without more information, establish that element x should be added to the partial intersection $I_{A,new}$. Accordingly, the parties can use an AHE-based protocol to enable P0 to determine whether element x should be added to the partial intersection $I_{A,new}$, without leaking element x to P1 or leaking elements of P1's set to P0. For example, at block 738, for each matching node that is found, P0 can compute one or more ciphertext pairs to be used for testing the element x. For instance, a node $\widetilde{\mathcal{D}}_i[j]$ that matches element x contains a ciphertext ct corresponding to each element of P1's set that is assigned to that node. (Depending on implementation, there could be anywhere from 1 to 4σ ciphertexts in the node.) For each ciphertext $ct \in \widetilde{\mathcal{D}}_i[j]$, P0 can sample a random value α and compute $ct_\alpha := \text{Enc}_{pk0}(\alpha)$, $ct_\beta := \text{Enc}_{pk1}(x+\alpha) \ominus ct$. At block 740, a set $C_0$ of ciphertext pairs $(ct_\alpha, ct_\beta)$ for element x can be sent to P1.

Figure 7C:
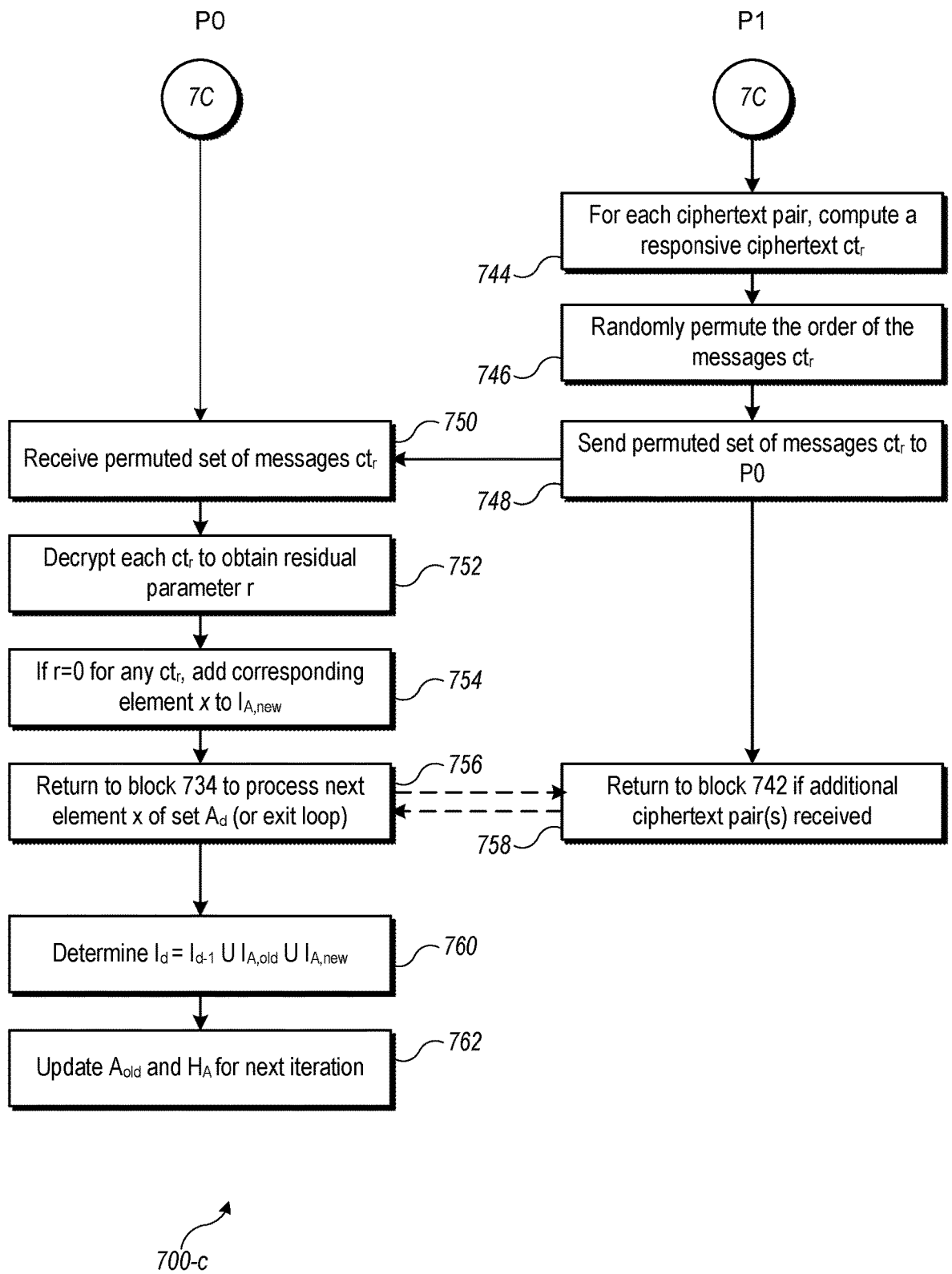

At block 742, P1 can receive the set $C_0$ of ciphertext pairs $(ct_\alpha, ct_\beta)$. Referring to FIG. 7C, at block 744, for each ciphertext pair $(ct_\alpha, ct_\beta)$, P1 can compute a responsive ciphertext $ct_r$. For example, for each ciphertext pair $(ct_\alpha, ct_\beta)$ P1 can sample a random value γ and compute $\beta := \text{Dec}_{sk1}(ct_\beta)$, $ct_r := \gamma \odot (\text{Enc}_{pk0}(\beta) \oplus ct_\alpha)$. In this manner, P1 can generate a set $C_1$ that contains one responsive ciphertext $ct_r$ for each ciphertext pair $(ct_\alpha, ct_\beta)$. At block 746, P1 can randomly permute the order of the responsive ciphertexts $ct_r$ in set $C_1$, and at block 748, P1 can send the permuted set $C_1$ to P0.

At block 750, P0 can receive the permuted set $C_1$. At block 752, for each ciphertext $ct_r$ in set $C_1$, P0 can compute a residual parameter r by decrypting $ct_r$ using its private key $sk_0$. That is, $r := \text{Dec}_{sk0}(ct_r)$. Due to the AHE protocol, the result $r=0$ indicates a match between element x and an element of P1's set, while $r \neq 0$ indicates not a match. Accordingly, at block 754, if block 752 yields $r=0$ for any $ct_r$, then element x is added to the partial intersection $I_{A,new}$. At block 756, P0 can return to block 734 to process the next element of set $A_d$. As shown at block 758, P1 can return to block 742 to process additional ciphertext pairs that may be received from P0.

Once all elements of set $A_d$ have been processed according to the processing loop of blocks 734-758, the loop can end. At this point P0 has learned $I_{A,new}$. Accordingly, at block 760, P0 can determine the (cumulative) intersection $I_d = I_{d-1} \cup I_{A,old} \cup I_{A,new}$.

At block 762, P0 can update set $A_{old}$ and hash set HA for the next iteration of process 700. The update procedure can be similar or identical to blocks 250-272 of process 200 as described above with reference to FIG. 2C.

Process 700 can be performed iteratively (e.g., daily) to repeatedly update the sets and the PSI. As with other processes described above, at each iteration P0 learns which of the old elements of set A are in common with newly added elements of P1's set B but does not learn which of the updates to set B matches any new element of $A_d$ that is added to the intersection. P1 does not learn any elements of set A from process 700. In some embodiments, if it is desired for P1 to also learn the PSI, process 700 can be repeated with the roles of P1 and P0 reversed. Alternatively, after determining the updated PSI (at block 760), P0 can communicate the updated PSI to P1.

It will be appreciated that the one-sided updatable PSI protocol of processes 600, 700, and 800 is illustrative and that variations and modifications are possible. Operations or blocks described as sequential can be performed in parallel, and the order of operations can be varied to the extent logic permits. Iterations of process 700 can be performed at any desired frequency, depending on how often it is useful to determine an updated PSI. For instance, in a contact-tracing application, a daily update may be appropriate. In other applications, updates may occur at shorter intervals (e.g., hourly) or longer intervals (e.g., weekly, monthly), or at arbitrary intervals, such as whenever either party has added $N_d$ elements to its set or on request of either party. In instances where the parties are intermittently in contact, the iteration interval can be a variable amount of time (e.g., all updates since last time the intersection was updated).

As described above, dummy values can be used to pad updated sets to a fixed size so that neither party learns how many elements were actually added to the other party's set during each iteration. Dummy values can be random numbers and the range of values can be chosen such that the probability of false positives is negligible. Alternatively, if desired, dummy values can be omitted, which would allow a party to learn how many elements were added to the other party's set on a given day but would prevent false positives due to dummy variables.

Processes other than process 800 can be used to update the binary tree. In process 800, the "pushing" of elements to the next level is based on a counter rather than on whether any node is full. As noted above, this can prevent information from leaking to P0 based on when pushing to the next level occurs.

Like other processes described herein, process 700 can provide improved computational efficiency and communication efficiency as compared to conventional techniques in which PSI is performed across the entirety of both sets each time an update is desired. In some embodiments, computation time and communication cost vary with each iteration, depending on how many nodes of the tree structure are populated. Over a large number of iterations, amortized computation time and communication cost each scale as $O(N_d \log N)$.

It should be noted that process 700 includes a protocol where one party (P1) obliviously updates an encrypted database (the tree structure) and another party (P0) can obliviously search the encrypted database. Those skilled in the art with access to this disclosure will appreciate that this technique can be applied in a variety of contexts where oblivious database search is desired and is not limited to updatable PSI.

In embodiments described above, party P0 has a set A that is private to party P0, and party P1 has a set B that is private to party P1. Conceptually, where sets are updated by adding elements, in each iteration of an updatable PSI protocol, set A can be understood as including three disjoint subsets: (1) elements that are in A∩B as a result of a previous iteration; (2) "residual" elements that are not in A∩B as a result of a previous iteration (denoted as $A_{old}$); and (3) newly added elements (denoted as $A_d$ or $A_{new}$). Similarly, set B can be understood as including three disjoint subsets: (1) elements that are in A∩B as a result of a previous iteration; (2) "new" elements that are not in A∩B as a result of a previous iteration (denoted as $B_{old}$); and (3) newly added elements (denoted as $B_d$ or $B_{new}$). Updatable PSI protocols as described herein (e.g., process 200 or process 700) include a first phase in which P0 learns a first partial intersection $A_{old} \cap B_{new}$ (without learning any other elements of $B_{new}$) and a second phase in which P0 learns a second partial intersection $A_{new} \cap (B_{new} \cup B_{old})$ (without learning either $A_{new} \cap B_{new}$ or $A_{new} \cap B_{old}$). The first phase can include P1 providing to P0 an encrypted representation of the newly added elements $B_{new}$, which P0 can compare to a correspondingly encrypted representation of old elements $A_{old}$ to identify matches. In a two-sided process such as process 200, the second phase can include P0 providing to P1 an encrypted representation of the newly added elements $A_{new}$, which P1 can compare to a correspondingly encrypted representation of old elements $B_{old}$ to determine $A_{new} \cap B_{old}$. P1 can then construct a set $B'_d$ that includes new elements $B_{new}$ as well as $A_{new} \cap B_{old}$ (and optionally dummy elements) and send an encrypted representation of set $B'_d$ to P0. P0 can use the encrypted representation to determine $A_{new} \cap (B_{new} \cup B_{old})$. P0 can then update A∩B based on the partial intersections learned in the first and second phase. Efficiency gains can be realized through the iterative nature of the process, which makes it unnecessary to consider elements that are already known to be in A∩B, and through P1 determining $A_{new} \cap B_{old}$ and using that information to reduce the number of elements of $B_{old}$ that P1 encrypts and sends to P0 in the second phase. In a one-sided process such as process 700, the second phase can include P1 providing an encrypted representation of set B (including new elements $B_d$ as well as residual elements $B_{old}$) in a data structure such as a binary tree that facilitates efficient identification by P0 of candidate elements of $A_{new}$ that might match elements of set B; P0 and P1 can perform a secure 2PC process to enable P1 to determine whether a given candidate element of $A_{new}$ has a matching element in B, without P1 learning any elements of $A_{new}$ or P0 learning any elements of B that are not in the intersection with set A.

When updates to sets A and B include weak deletion as described above, the possibility of elements being deleted from A∩B can be taken into account by using a process such as process 400 described above. Accordingly, rather than iteratively updating A∩B, the intersection can be computed anew at each update. The computation is divided into a first phase in which P0 learns a partial intersection of its elements from previous updates (excluding deleted elements) with the newly-added elements of P1's set and a second phase in which P0 learns a partial intersection of its newly-added elements with all elements currently in P1's set.

The private sets A and B can include data values representing any type of information that one or both parties may desire to compare to identify overlap. Example use-cases will now be described.

In a first example-use case, a web services provider ("WSP") may have a list of commercial websites maintained by merchants and visited by a user (or by users in some group of users). A financial services provider ("FSP") may have a list of financial transactions performed by the user (or group of users) with various merchants. The WSP may desire to know which websites the user transacted business with, or the FSP may desire to know which of the user's transactions correspond to websites the user visited. This information is expected to evolve over time as the user visits additional websites and/or conducts additional transactions. In some embodiments, the parties can perform a two-way updatable PSI process (e.g., process 200 as described above with reference to FIGS. 2A-2C) to allow both parties to update the PSI more efficiently. One of the parties (e.g., the WSP) can act as P0, with set A corresponding to the list of commercial websites; the other party (e.g., the FSP) can act as P1, with set B corresponding to the list of transactions. Since process 200 allows both parties learn the intersection, either party can act as P0 or P1. In this manner, the WSP only learns about financial transactions associated with websites on its list, and the FSP only learns about websites where the user conducted a financial transaction. Similarly, two financial institutions may use updatable PSI to periodically compare lists of account holders to determine overlap.

In a second-example use case, a user may maintain a list of passwords associated with various network-based accounts. A security service provider may maintain a list of passwords that are known to have been compromised (e.g., based on reported security breaches of various network-based systems). It may be desirable for the user to learn if any of their passwords have been compromised without learning any other information, and it may be desirable for the user not to reveal any passwords to the security service in the process. This information is expected to evolve over time. On the user's side, the user may create additional accounts. On the service provider's side, additional security breaches may become known, resulting in additions to the list of compromised passwords. In some embodiments, a one-way updatable PSI process (e.g., process 700 of FIGS. 7A-7C) can be used. The user (or user's device) can act as P0, with set A corresponding to the list of passwords. The security service provider can act as P1, with set B corresponding to the list of compromised passwords. In this manner, the user can learn which, if any, of their passwords have been compromised, without the security service learning any of the user's passwords and without the user learning anything other than the compromised passwords.

In a third example use-case, a user may have a list of contacts, and a service provider may have a list of subscribers to the service. (As used herein, a "subscriber" can be anyone who maintains an account or other record with the service provider and is not limited to paying subscribers.) It may be desirable for the user and/or the service provider to learn whether any of the user's contacts are also subscribers to the service. This information is expected to evolve over time, as the user makes additional contacts and as new subscribers sign up for the service. In some embodiments, a one-way updatable PSI process (e.g., process 700 of FIGS. 7A-7C) can be used to allow the user to learn whether any of their contacts are subscribers to the service without the service provider learning any information about the user's contacts. The user (or user's device) can as P0, with set A corresponding to the user's contact list. The service provider can act as P1, with set B corresponding to the list of subscribers. In this manner, the user can learn whether any of their contacts are subscribers to the service, without the service learning any of the user's contacts and without the user learning about subscribers who are not among the user's contacts. In other embodiments, a two-way updatable PSI process (e.g., process 200 of FIGS. 2A-2C) can be used to allow the user and the service provider to learn whether any of the user's contacts are also subscribers to the service. For instance, the user (or user's device) can act as P0, with set A corresponding to the user's contact list. The service provider can act as P1, with set B corresponding to the list of subscribers. In this manner, both parties can learn whether any of the user's contacts are also subscribers to the service, without the user learning about any other subscribers and without the service provider learning about any of the user's contacts who are not subscribers.

In a fourth example use-case, a public health service may have a list of individuals who have been diagnosed with an infectious disease. An individual user may have a list of individuals that the user has come into contact with during a relevant incubation period of the infectious disease (e.g., 14 days, 5 days, or some other period). In some embodiments, a random coding scheme can be used to anonymously represent individuals for purposes of contact tracing. For example, user devices can periodically transmit a random code that can be detected and stored by other user devices nearby. (Information such as date, time, and location can also be stored with each received code, to facilitate disambiguation of codes.) If an individual is diagnosed with the infectious disease, the random codes that were transmitted by their device during the incubation period of the disease can be entered into the list of infected persons. A user's contact with an infected person can be detected by comparing the random codes stored by the user's device with the random codes in the list of infected persons. A user may desire to know whether they have come into contact with someone who has been diagnosed. This information is expected to evolve over time, as the user encounters different people and old encounters recede far enough into the past to be relevant to the possibility of infection, and as additional people are diagnosed with the infectious disease. In some embodiments, an updatable PSI process with weak deletion (e.g., process 400 of FIGS. 4A and 4B) can be used to allow the user (and the public health service) to learn whether the user has come into contact with any infected persons. For instance, the user (or user's device) can act as P0, with set A corresponding to the user's list of contacts. The public health service can act as P1, with set B corresponding to the list of infected persons. In this manner, the user and/or the public health service can learn whether the user has had contact with an infected person, without the user learning any information about other infected people and without the public health service learning about the user's non-infected contacts.

While the foregoing description makes reference to specific embodiments, those skilled in the art will appreciate that the description is not exhaustive of all embodiments. Many variations and modifications are possible. The semantic meaning of the elements of various sets is not limited to any particular example. For instance, elements of the sets may represent individuals, device identifiers, financial account information (e.g., account numbers), transaction information, location data, and so on, and the intersection of private sets may be determined by or on behalf of individuals, financial institutions, schools, governmental agencies, or other organizations. Techniques described herein can be applied in any context where it is desirable for parties to determine and update intersection of two (or more) sets without revealing elements not in the intersection. It should also be understood that embodiments are not limited to actions performed by or on behalf of individuals; the parties can be any systems or services for which identifying data or events held in common may be of interest. The protocols described herein assume that parties P0 and P1 are at least semi-honest, and each party does not retain or apply information received from the other, except as specified by the protocol. Embodiments can also be extended to intersections of more than two sets, in that any party that knows $A \cap B$ can use updatable PSI techniques as described herein to determine $(A \cap B) \cap C$. For instance, a party that learns $A \cap B$ via an updatable PSI protocol and a party that knows C can perform an updatable PSI protocol using $A \cap B$ as its private set to determine $(A \cap B) \cap C$.

Techniques described herein can be implemented by suitable programming of general-purpose computers. In some embodiments, a computer system includes a single computer apparatus, where the subsystems can be components of the computer apparatus. The computer apparatus can have a variety of form factors including, e.g., a smart phone, a tablet computer, a laptop computer, a desktop computer, etc. In other embodiments, a computer system can include multiple computer apparatuses, each being a subsystem, with internal components. As described above, updatable PSI techniques can reduce the computational load on the computer system in any context where the computer system needs to determine the intersection of a first set of data held by the computer system with a second set of data held by a different computer system without learning elements of the second set that are not in the intersection; this can increase efficiency of the computer system.

A computer system can include a plurality of components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Rust, Golang, Swift, or scripting language such as Perl or Python using, for example, conventional or object-oriented techniques. The software code may be stored as a series of instructions or commands on a computer readable storage medium; suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable storage medium may be any combination of such storage devices or other storage devices capable of retaining stored data.

Such programs may also be encoded and transmitted using carrier signals adapted for transmission via wired, optical, and/or wireless networks conforming to a variety of protocols, including the Internet. As such, a computer readable transmission medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

The above description is illustrative and is not restrictive. Many variations of the invention will become apparent to those skilled in the art upon review of the disclosure. The scope of patent protection should, therefore, be determined not with reference to the above description, but instead should be determined with reference to the following claims along with their full scope or equivalents.

What is claimed is:

1. A method of computing a private set intersection, the method comprising, by a first computer system:
    defining a first set (A) that is private to the first computer system, wherein the first set A includes a first residual subset $A_{old}$ of elements that are not in an intersection (A∩B) with a second set (B) that is private to a second computer system, wherein the second set B includes a second residual subset ($B_{old}$) of elements that are not in the intersection A∩B;
    updating the first set A by adding a first new subset ($A_d$) of one or more new elements;
    determining, based on a first communication process with the second computer system, a first partial intersection ($I_{A,old}=A_{old}\cap B_d$) of the first residual subset $A_{old}$ with a second new subset $B_d$ of one or more new elements that have been added to the second set B, wherein the first computer system learns only the elements of the second new subset $B_d$ that are in the first partial intersection $I_{A,old}$;
    receiving, from the second computer system, a first encrypted set ($B'_d$) that includes encrypted elements representing the second new subset $B_d$ and at least some elements of the second residual subset $B_{old}$;
    determining, based on a second communication process with the second computer system, a second partial intersection ($I_{A,new}=A_d\cap B'_d$) of the first new subset $A_d$ and the first encrypted set $B'_d$, wherein the first computer system learns only the elements of the first encrypted set $B'_d$ that are in the second partial intersection $I_{A,new}$;
    updating the intersection A∩B based on the first partial intersection $I_{A,old}$ and the second partial intersection $I_{A,new}$; and
    updating the first residual subset $A_{old}$ based on the updated intersection.

2. The method of claim 1 wherein the acts of updating the first set A, determining the first partial intersection, receiving the first encrypted set, determining the second partial intersection, updating the intersection A∩B, and updating the first residual subset are performed iteratively for each of a plurality of successive update periods.

3. The method of claim 1 wherein determining the first partial intersection $I_{A,old}$ includes:
    receiving, from the second computer system, a second encrypted set that includes encrypted elements representing the second new subset $B_d$; and
    determining, using the first set of encrypted data and a correspondingly encrypted representation of the first residual subset $A_{old}$, the first partial intersection $I_{A,old}$.

4. The method of claim 3 wherein the second encrypted set is generated by applying a hash function to each of the elements of the second new subset $B_d$ and raising each result of applying the hash function to a power (k1) that is secret to the second computer system.

5. The method of claim 4 wherein determining the first partial intersection $I_{A,old}$ includes:
    applying the hash function to each of the elements of the first new subset $A_d$;
    raising each result of applying the hash function to a power (k0) that is secret to the first computer system, thereby producing a third encrypted set;
    sending the third encrypted set to the second computer system;
    receiving, from the second computer system, a first working set that includes each element of the third encrypted set raised to the power k1 that is secret to the second computer system;
    raising each element of the second encrypted set to the power k0 that is secret to the first computer system, thereby producing a second working set; and
    comparing elements of the first working set and the second working set.

6. The method of claim 1 further comprising:
    generating a second encrypted set that includes elements representing the first new subset $A_d$; and
    sending, to the second computer system, the second encrypted set, wherein the second computer system uses the second encrypted set to generate the first encrypted set $B'_d$.

7. The method of claim 6 wherein the first encrypted set $B'_d$ includes a union of the second new subset $B_d$ with an intersection $(A_d \cap B_{old})$ of the first new subset $A_d$ and the second residual subset $B_{old}$.

8. The method of claim 1 wherein the second communication process with the second computer system includes:
receiving a set of updates to an encrypted tree structure that represents the second set B.

9. A first computer system comprising:
a communication interface configured to communicate with a second computer system;
a memory to store a first set (A) that is private to the first computer system, wherein the first set A includes a first residual subset $A_{old}$ of elements that are not in an intersection (A∩B) with a second set (B) that is private to the second computer system, wherein the second set B includes a second residual subset ($B_{old}$) of elements that are not in the intersection A∩B; and
a processor coupled to the memory and configured to:
update the first set A by adding a first new subset ($A_d$) of one or more new elements;
determine, based on a first communication process with the second computer system, a first partial intersection ($I_{A,old}=A_{old} \cap B_d$) of the first residual subset $A_{old}$ with a second new subset $B_d$ of one or more new elements that have been added to the second set B, wherein the first computer system learns only the elements of the second new subset $B_d$ that are in the first partial intersection $I_{A,old}$;
receive, from the second computer system, a first encrypted set ($B'_d$) that includes encrypted elements representing the second new subset $B_d$ and at least some elements of the second residual subset $B_{old}$;
determine, based on a second communication process with the second computer system, a second partial intersection ($I_{A,new}=A_d \cap B'_d$) of the first new subset $A_d$ and the first encrypted set $B'_d$, wherein the first computer system learns only the elements of the first encrypted set $B'_d$ that are in the second partial intersection $I_{A,new}$;
update the intersection A∩B based on the first partial intersection $I_{A,old}$ and the second partial intersection $I_{A,new}$; and
update the first residual subset $A_{old}$ based on the updated intersection.

10. The system of claim 9 wherein the processor is further configured to:
generate a second encrypted set that includes elements representing the first new subset $A_d$; and
send, to the second computer system, the second encrypted set,
wherein the second computer system is configured to use the second encrypted set to generate the first encrypted set $B'_d$.

11. The system of claim 10 wherein the first encrypted set $B'_d$ includes a union of the second new subset $B_d$ with an intersection $(A_d \cap B_{old})$ of the first new subset $A_d$ and the second residual subset $B_{old}$.

12. The system of claim 11 wherein the first encrypted set $B'_d$ further includes one or more dummy elements such that a size of the first encrypted set $B'_d$ is fixed.

13. The system of claim 9 wherein the elements of the first set represent contacts of an individual and wherein the elements of the second set represent subscribers of a service.

14. The system of claim 9 wherein the elements of the first set represent websites visited by a user and wherein the elements of the second set represent financial transactions of the user.

15. The system of claim 9 wherein the elements of the first set represent account holders at a first financial institution and the elements of the second set represent account holders at a second financial institution.

16. A computer-readable storage medium having stored therein program code instructions that, when executed by a processor of a first computer system, cause the first computer system to perform a method comprising:
defining a first set (A) that is private to the first computer system, wherein the first set A includes a first residual subset $A_{old}$ of elements that are not in an intersection (A∩B) with a second set (B) that is private to a second computer system, wherein the second set B includes a second residual subset ($B_{old}$) of elements that are not in the intersection A∩B;
updating the first set A by adding a first new subset ($A_d$) of one or more new elements;
determining, based on a first communication process with the second computer system, a first partial intersection ($I_{A,old}=A_{old} \cap B_d$) of the first residual subset $A_{old}$ with a second new subset $B_d$ of one or more new elements that have been added to the second set B, wherein the first computer system learns only the elements of the second new subset $B_d$ that are in the first partial intersection $I_{A,old}$;
receiving, from the second computer system, a first encrypted set ($B'_d$) that includes encrypted elements representing the second new subset $B_d$ and at least some elements of the second residual subset $B_{old}$;
determining, based on a second communication process with the second computer system, a second partial intersection ($I_{A,new}=A_d \cap B'_d$) of the first new subset $A_d$ and the first encrypted set $B'_d$, wherein the first computer system learns only the elements of the first encrypted set $B'_d$ that are in the second partial intersection $I_{A,new}$;
updating the intersection A∩B based on the first partial intersection $I_{A,old}$ and the second partial intersection $I_{A,new}$; and
updating the first residual subset $A_{old}$ based on the updated intersection;
wherein the acts of updating the first set A, determining the first partial intersection, receiving the first encrypted set, determining the second partial intersection, updating the intersection A∩B, and updating the first residual subset are performed iteratively for each of a plurality of successive update periods.

17. The computer-readable storage medium of claim 16 wherein the first encrypted set $B'_d$ is received as a binary tree structure that includes encrypted elements corresponding to the elements of the second new subset $B_d$ and the second residual subset $B_{old}$.

18. The computer-readable storage medium of claim 16 wherein updating the intersection A∩B based on the first partial intersection $I_{A,old}$ and the second partial intersection $I_{A,new}$ includes:
defining an update set ($I_{update}$), wherein $I_{update}=I_{A,new} \cup I_{A,old}$; and
determining an updated intersection A∩B:=(A∩B)∪$I_{update}$.

19. The computer-readable storage medium of claim 18 wherein the method further comprises:

sending the update set $I_{update}$ to the second computer system.

20. The computer-readable storage medium of claim 16 wherein determining the first partial intersection $I_{A,old}$ includes:
- receiving, from the second computer system, a second encrypted set that includes encrypted elements representing the second new subset $B_d$; and
- determining, using the first set of encrypted data and a correspondingly encrypted representation of the first residual subset $A_{old}$, the first partial intersection $I_{A,old}$.

* * * * *